US010021633B2

(12) United States Patent
Zhuang et al.

(10) Patent No.: US 10,021,633 B2
(45) Date of Patent: Jul. 10, 2018

(54) METHOD, APPARATUS, AND SYSTEM FOR ACCESSING TO A MOBILE COMMUNICATION NETWORK

(71) Applicant: Huawei Technologies Co., Ltd., Shenzhen (CN)

(72) Inventors: Hongcheng Zhuang, Shenzhen (CN); Jietao Zhang, Shenzhen (CN); Zezhou Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 15/069,332

(22) Filed: Mar. 14, 2016

(65) Prior Publication Data

US 2016/0198401 A1 Jul. 7, 2016

Related U.S. Application Data

(63) Continuation of application No. 13/785,357, filed on Mar. 5, 2013, now Pat. No. 9,319,954, which is a (Continued)

(30) Foreign Application Priority Data

Jan. 31, 2011 (CN) .......................... 2011 1 0033952

(51) Int. Cl.
*H04W 48/18* (2009.01)
*H04W 28/02* (2009.01)
(Continued)

(52) U.S. Cl.
CPC ....... *H04W 48/18* (2013.01); *H04W 28/0268* (2013.01); *H04W 36/165* (2013.01);
(Continued)

(58) Field of Classification Search
None
See application file for complete search history.

(56) References Cited

U.S. PATENT DOCUMENTS 7,738,876 B1   6/2010  Radhakrishnan et al.
8,391,224 B2   3/2013  Krym et al.
(Continued)

FOREIGN PATENT DOCUMENTS

CN   1578487 A   2/2005
CN   1581820 A   2/2005
(Continued)

OTHER PUBLICATIONS

Hu H. et al., "Self-Configuration and Self-Optimization for LTE Networks," LTE Technology Update, IEEE Communication Magazine, Feb. 2010, pp. 94-100.
(Continued)

*Primary Examiner* — Brian Roberts
(74) *Attorney, Agent, or Firm* — Conley Rose, P.C.

(57) ABSTRACT

A method for accessing to a mobile communication network, comprising: acquiring a session matching level for each cell, which is calculated based on a session type of a session initiated by a user terminal as needed, a session data rate available to the user terminal of each cell and load balance parameters of each cell; accessing to a cell selected according to the session matching level for each cell. Further, it also provides another method for accessing to a mobile communication network, and corresponding user terminal, network-side device and communication system.

33 Claims, 5 Drawing Sheets

Related U.S. Application Data continuation of application No. PCT/CN2011/078895, filed on Aug. 25, 2011.

(51) Int. Cl.

| | | |
|---|---|---|
| *H04W 48/20* | (2009.01) | |
| *H04W 36/16* | (2009.01) | |
| *H04W 48/16* | (2009.01) | |
| *H04W 72/08* | (2009.01) | |
| *H04W 24/02* | (2009.01) | |
| *H04W 36/22* | (2009.01) | |

(52) U.S. Cl.
CPC ........... *H04W 48/16* (2013.01); *H04W 48/20* (2013.01); *H04W 72/082* (2013.01); *H04W 24/02* (2013.01); *H04W 36/22* (2013.01)

(56) References Cited

U.S. PATENT DOCUMENTS

| | | |
|---|---|---|
| 8,620,322 B2 | 12/2013 | Park et al. |
| 8,676,186 B2 | 3/2014 | Niu |
| 8,737,229 B2 | 5/2014 | Khandekar et al. |
| 2006/0166677 A1 | 7/2006 | Derakshan et al. |
| 2006/0178144 A1 | 8/2006 | Kuroda |
| 2006/0187873 A1 | 8/2006 | Friday et al. |
| 2007/0189241 A1 | 8/2007 | Zhang |
| 2008/0268833 A1 | 10/2008 | Huang et al. |
| 2009/0097454 A1 | 4/2009 | Yeou et al. |
| 2009/0154425 A1 | 6/2009 | Patil et al. |
| 2009/0163223 A1 | 6/2009 | Casey |
| 2010/0008230 A1 | 1/2010 | Khanderkar et al. |
| 2010/0113019 A1 | 5/2010 | Jeong et al. |
| 2010/0273485 A1 | 10/2010 | Huang et al. |
| 2010/0311435 A1 | 12/2010 | Mueck et al. |
| 2011/0019639 A1 | 1/2011 | Karaoguz et al. |
| 2011/0128862 A1 | 6/2011 | Kallin et al. |
| 2011/0171952 A1 | 7/2011 | Niu |
| 2012/0028648 A1 | 2/2012 | Chayat et al. |
| 2012/0178483 A1 | 6/2012 | Rosenau |
| 2013/0044694 A1 | 2/2013 | Aguirre et al. |
| 2013/0114482 A1 | 5/2013 | Oh et al. |
| 2013/0121166 A1 | 5/2013 | Berg et al. |
| 2013/0188565 A1 | 7/2013 | Wang et al. |

FOREIGN PATENT DOCUMENTS

| | | |
|---|---|---|
| CN | 1601979 A | 3/2005 |
| CN | 101335990 A | 12/2008 |
| CN | 101355521 A | 1/2009 |
| CN | 101516115 A | 8/2009 |
| CN | 101583164 A | 11/2009 |
| CN | 101594641 A | 12/2009 |
| CN | 101600226 A | 12/2009 |
| CN | 101686497 A | 3/2010 |
| CN | 101742565 A | 6/2010 |
| CN | 101784061 A | 7/2010 |
| CN | 101801049 A | 8/2010 |
| WO | 2005011305 A1 | 2/2005 |
| WO | 2009076619 A1 | 6/2009 |
| WO | 2009099990 A1 | 8/2009 |
| WO | 2010039906 A1 | 4/2010 |

OTHER PUBLICATIONS

"Additional Information to be exchanged for intra-LTE UL MLB purposes," Nokia Siemens Networks, Vodafone, 3GPP TSG RAN WG3 Meeting #69, R3-102440, Aug. 23-27, 2010, 4 pages.

Partial English Translation and Abstract of Chinese Patent Application No. CN101801049, Aug. 11, 2010, 15 pages.

Foreign Communication From a Counterpart Application, Chinese Application No. 201110033952.X, Chinese Office Action dated Sep. 9, 2014, 8 pages.

Foreign Communication From a Counterpart Application, Chinese Application No. 201110033952.X, Chinese Office Action dated Feb. 8, 2014, 7 pages.

Foreign Communication From a Counterpart Application, Chinese Application No. 201110033952.X, Chinese Notice of Allowance dated Aug. 5, 2015, 4 pages.

Foreign Communication From a Counterpart Application, European Application No. 11857915.0, Extended European Search Report dated Aug. 14, 2013, 9 pages.

Foreign Communication From a Counterpart Application, PCT Application No. PCT/CN2011/078895, English Translation of International Search Report dated Dec. 8, 2011, 2 pages.

Foreign Communication From a Counterpart Application, PCT Application No. PCT/CN2011/078895, English Translation of Written Opinion dated Dec. 8, 2011, 21 pages.

Office Action dated Sep. 23, 2014, 36 pages, U.S. Appl. No. 13/785,357, filed Mar. 5, 2013.

Office Action dated Mar. 20, 2015, 23 pages, U.S. Appl. No. 13/785,357, filed Mar. 5, 2013.

Notice of Allowance dated Dec. 11, 2015, 11 pages, U.S. Appl. No. 13/785,357, filed Mar. 5, 2013.

METHOD, APPARATUS, AND SYSTEM FOR ACCESSING TO A MOBILE COMMUNICATION NETWORK

CROSS REFERENCE TO RELATED APPLICATIONS

This application is a continuation of U.S. patent application Ser. No. 13/785,357, filed on Mar. 5, 2013, which is a continuation of International Application No. PCT/CN2011/078895, filed on Aug. 25, 2011, which claims priority to Chinese Patent Application No. 201110033952.X, filed on Jan. 31, 2011. The afore-mentioned patent applications are hereby incorporated by reference in their entireties.

TECHNICAL FIELD

The present application relates to the field of communication technology, and specifically to a method, apparatus, and system for accessing to a mobile communication network.

BACKGROUND

With the continuous expansions of the scale of mobile communication network and the development of miniaturization of base stations, the number of network elements needed to be maintained by the operators is increasing rapidly, and the cost for maintenance is growing as well. To this end, a self-organization network (SON) mechanism is proposed which is intended to achieve a purpose of saving operating cost by realizing automation as much as possible in the phases of planning, deployment, operation and maintenance for the mobile communication network.

For the convenience of research and standardization on problems, the prior art defines a series of use cases for SON Standardization, and discusses corresponding solutions for each cases. Mobility Load Balance (MLB) is one of the solutions which is mainly used to solve the problem occurred in the course of automatically configuring and optimizing mobility-related parameters, the mobility-related parameters covers switching and cell reselection parameters. In terms of MLB, first, it is often important to precisely estimate information about the load of a cell, then exchange information by interfaces among the nodes, acquire information about the load of adjacent cells (also known as neighbor cells). Based on the load conditions of the adjacent cells along with certain algorithms and principles, the network modifies the parameters between the serving cell and respective adjacent cells, which may cause a terminal to reselect and switch to another cell. Thus, the load of the whole network will be more evenly distributed. Accordingly, the purpose of improving the capacity of a network, increasing the success rate for user access and reducing access delay will be achieved finally.

The existing MLB technology is mainly to migrate the users in an overloaded cell to an adjacent cell having a lighter load, which particularly can be realized by adjusting switching parameters. For instance, a virtual parameter $T_c$ can be used to adjust cell selection performed by users as follows:

$$X(u) = \underset{c}{\mathrm{argmax}}\, P_{c\square} L_c(\vec{q}_u, \Theta_c) \cdot T_c$$

wherein $X(\mu)$ stands for the signal strength. It can be seen from the equation that the signal strength $X(\mu)$ turns weaker when the parameter $T_c$ gets smaller, while the signal strength $X(\mu)$ turns stronger when the parameter $T_c$ gets larger. Since the cell selection performed by a user is dependent on the signal strength, the parameter $T_c$ of a certain cell can be reduced when the load of this cell is larger than a predetermined threshold value. As such, the user of this cell will select an adjacent cell when he performs cell reselection, thereby the load of this cell can be mitigated. In contrast, when the load of a certain cell is smaller than a predetermined threshold value, the parameter $T_c$ of this cell will be increased. As such, users of adjacent cells will select this cell when they perform cell reselection, thereby more users may access to this cell.

In the course of research and practice of prior art, the inventor of the present disclosure discovers that when a plurality of users gather in some certain cells, though the call dropping rate/blocking rate can be reduced by forcing some users to switch to adjacent cells by means of adjusting switching parameters, spectral efficiency may correspondingly be reduced at the same time, especially when the user is relative far from the adjacent cell, the spectral efficiency is reduced more significantly, which may lead to a worse user experience.

SUMMARY

The embodiments of the present disclosure is to provide a method, apparatus and system for accessing to a mobile communication network, which may enhance the spectral efficiency when reduced call dropping rate/blocking rate is ensured.

A method for accessing to a mobile communication network, comprising acquiring a session matching level for each cell, which is acquired by calculating a session type of a session initiated by a user terminal as needed, a session data rate available to the user terminal in each cell and load balance parameters of said each cell; accessing to a cell selected based on the acquired session matching level for each cell.

A method for accessing to a mobile communication network, comprising acquiring a session type of a session initiated by a user terminal as needed, a session data rate available to the user terminal in serving cell and load balance parameters of the serving cell; calculating the session matching level for the serving cell based on the acquired session type, session data rate available to the user terminal in the serving cell and load balance parameters of the serving cell; transmitting the session matching level to the user terminal so that the user terminal accesses to a cell selected according to the received session matching level for each cell; or acquiring session matching levels transmitted by other cells, selecting, according to the session matching levels of the serving cell and other cells, a cell for the user terminal, and notifying the user terminal of the selected cell so as to access to the selected cell by the user terminal.

A user terminal, comprising an acquisition unit configured to acquire the session matching level for each cell which is calculated according to a session type of a session initiated by a user terminal as needed, a session data rate available to the user terminal in each cell and load balance parameters of said each cell; an access unit configured to select a cell to access according to the session matching level for said each cell which is acquired by the acquisition unit.

A network-side device, comprising an acquisition unit for acquiring a session type of a session initiated by a user terminal as needed, a session data rate available to user terminal in the serving cell and load balance parameters of serving cell; a calculating unit configured to calculate the session matching level for the serving cell according to the acquired session type, the session data rate available to the user terminal in the serving cell and load balance parameters of the serving cell; a transmission unit configured to transmit the session matching level to the user terminal so that the user terminal accesses to a cell selected according to the received session matching level for each cell; or to acquire the session matching levels transmitted by other cells, select a cell for the user terminal based on the session matching levels for the serving cell and other cells, and notify the user terminal of the selected cell for the user terminal to access.

A communication system comprises a user terminal and at least two network-side devices. The user terminal is configured to acquire a session type of a session initiated by itself as needed, a session data rate available to itself in each cell and load balance parameters of said each cell, to calculate the session matching level for each cell based on the session type, the session data rate available to itself in each cell and the load balance parameters of said each cell, and to access to a cell selected based on the session matching level for said each cell; each of the network-side devices is configured to transmit to the user terminal the session data rate available to the user terminal in the cell to which the network-side device belongs and the load balance parameters of the cell to which the network-side device belongs.

A communication system comprises a user terminal and at least two network-side devices. The user terminal is configured to acquire a session matching level transmitted by each cell, and to access to a cell selected based on the session matching level for said each cell; each of the network-side devices is configured to acquire a session type of the sessions initiated by the user terminal as needed, a session data rate available to the user terminal in the cell to which the network-side device belongs and load balance parameters of the cell to which the network-side device belongs, to calculate the session matching level for the serving cell based on the acquired session type, the session data rate available to the user terminal in the cell to which the network-side device belongings and load balance parameters of the cell to which the network-side device belongs, and to transmit the session matching level to the user terminal.

A communication system comprises a user terminal and at least two network-side devices. The user terminal is configured to receive a notification transmitted by the network-side devices where the user terminal is located, the notification indicating the cell selected for the user terminal, and to access to the cell selected according to the notification; each of the network-side devices is configured to acquire a session type of a session initiated by the user terminal as needed, a session data rate available to the user terminal in the serving cell and load balance parameters of the serving cell, to calculate the session matching level for the serving cell based on the acquired session type, session data rate available to the user terminal within the serving cell and load balance parameters of the serving cell, to acquire the session matching levels transmitted by other cells, to select a cell for the user terminal according to the session matching level for the serving cell and the other cells, and to notify the user terminal of the selected cell.

The embodiments of the present disclosure calculate the session matching level for each cell based on a session type, a session data rate available to the user terminal within each cell and load balance parameters for each cell, so that the user terminal can flexibly select an appropriate cell for accessing based on the session matching level, so as to adapt to various network load conditions. Since the user terminal can select the most appropriate cell in the current network for accessing, the occurrence of a poor quality of conversation caused by accessing to an overloaded cell can be avoided, which is beneficial for reducing the call dropping rate/blocking rate and increasing the spectral efficiency.

BRIEF DESCRIPTION OF THE DRAWING

In order to clearly illustrate the technical solutions in the embodiments of the present application, the accompanying drawings, which will be necessarily used in the description of the embodiments, will be explained. It is apparent for those skills in the art that the figures described below, from which some other figures can also be derived without any creative practice, are merely some embodiments of the present disclosure.

DETAILED DESCRIPTION

Hereinafter, the technical solutions of the embodiments in the present disclosure will be clearly and fully described in combination with the drawings of the embodiments of the present disclosure. It is apparent that the embodiments described herein are merely parts, but not all, of the possible embodiments of the present disclosure. All the other embodiments, which are derived by those skilled in the art based on the embodiments of the present disclosure without any creative practice, will fall within the protection scope of the present disclosure.

The present application relates to a method, apparatus and system for accessing to a mobile communication network, which will be explained in detail as follows respectively.

Embodiment 1

This embodiment will be described from the perspective of a user terminal. Specifically, the user terminal may refer to a mobile phone, a laptop, a personal computer (PC) and the like.

A method for accessing to a mobile communication network comprises acquiring a session matching level for each cell, and accessing to a cell selected based on the session matching level for said each cell. In this embodiment, the session matching level is acquired based on a session type of a session initiated by a user terminal as needed, a session data rate available to the user terminal in each cell and load balance parameters of said each cell.

Figure 1:
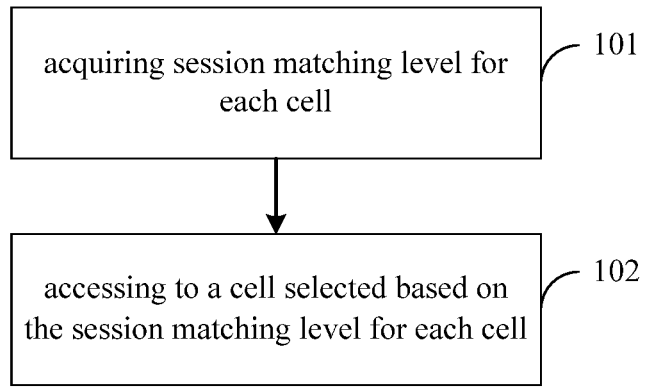
FIG. 1 is a flowchart of a method for accessing to a mobile communication network according to the first embodiment of the present disclosure.

FIG. 1 depicts a particular flow as follows.

At 101, a session matching level for each cell is acquired. The session matching level therein is derived by calculating a session type of a session initiated by a user terminal as needed, a session data rate (corresponding to the signal strength) available to the user terminal in each cell and load balance parameters of each cell. For instance, any one of the following methods can be used to acquire the session matching level for each cell.

(1) The session matching level can calculate by a user terminal in a method of: acquiring a session type of a session initiated by a user terminal as needed, a session data rate available to the user terminal in each cell and load balance parameters of each cell, according to which the session matching level for each cell can be calculated respectively.

For example, a session type of a session initiated by a user terminal as needed will be obtained. Then, according to the session type, it will be derived a Radio Access Technology (RAT) session support level of the session type in each cell, a session data rate available to the user terminal in each cell and load balance parameters for each cell. In this embodiment, the load balance parameters include switching factor and frequency migration factor and the like. Thereafter, the user terminal calculates the session matching level for each cell according to the RAT session support level for each cell, the session data rate available to the user terminal in each cell, switching and frequency migration factors in each cell and the like, which can be expressed as the following expression:

$$M_{s,c,u} = M_{rat,s} R_{c,u} (1 + a_{c,ss} - a_{c,ho});$$

wherein $M_{s,c,u}$ the session matching level obtained when user terminal U conducts session S in cell C; $M_{rat,s}$ denotes the RAT session support level of session S by cell C; $R_{c,u}$ denotes the data rate available to user terminal U for session S in cell C; $a_{c,ss}$ denotes the frequency migration factor; $a_{c,ho}$ denotes the switching factor. The session matching level obtained when the user terminal conducts a session in each cell can be calculated based on the above expression.

In this embodiment, "the session data rate available to the user terminal" can be calculated based on the Signal to Interference plus Noise Ratio (SINR) of the path from a user terminal to a base station and the minimum resource unit allocated to the session by a cell, which can be expressed as the following expression:

$$R_{c,u} = W_{c,s} \log_2(1 + SINR_{c,u});$$

wherein $SINR_{c,u}$ stands for the Signal to Interference plus Noise Ratio of the path from a user terminal to a base station, $W_{c,s}$ stands for the minimum resource unit allocated to the session S by cell C, which refers to the spectrum resource in the embodiments of the present application.

It is important to further explain that, in the embodiments of the present application, the session matching level refers to the suitability for a cell to serve the session. The RAT session support level of a cell refers to the level of the session type being supported by the RAT employed by a cell.

(2) The session matching level can be calculated by a network-side device in a method of configuring each cell to calculate its own session matching level based on a session type of the session initiated by a user terminal as needed, a session data rate available to the user terminal in each cell and load balance parameters for each cell, and then transmitting the session matching level to the user terminal. That is, at this point, for the user end, acquiring the session matching level for each cell particularly may become: receiving the session matching levels of respective cells.

For instance, assuming that there are cells C1, C2 and C3 in a network, when the user terminal U needs to conduct a session S, cell C1 calculates the session matching level $M_{s,c1,u}$ based on the type of session S, the session data rate available to the user terminal in C1 and the load balance parameters of cell C1, then the session matching level $M_{s,c1,u}$ is transmitted to user terminal U; cell C2 calculates the session matching level $M_{s,c2,u}$ based on the type of session S, the session data rate available to the user terminal in cell C2 and the load balance parameters of cell C2, then the session matching level $M_{s,c2,u}$ is transmitted to the user terminal U; similarly, cell C3 calculates the session matching level $M_{s,c3,u}$ based on the type of session S, the session data rate available to the user terminal in C3 and the load balance parameters of C3, then the session matching level $M_{s,c3,u}$ is transmitted to the user terminal U, and so on.

In this embodiment, in order for each cell to calculate its own session matching level based on a session type of the session initiated by a user terminal as needed, a session data rate available to the user terminal in each cell and load balance parameters, the cell is configured to: acquire a session type of the session initiated by a user terminal as needed, acquire the RAT session support level of the session type in each cell based on the acquired session type, and acquire the session data rate available to the user terminal in the serving cell and the load balance parameters of the serving cell; then calculate its own session matching level according to these parameters. In this embodiment, the load balance parameters include switching factor and frequency migration factor. Note that, for the convenience of description, in the embodiments regarding network-side device, serving cell refers to the cell to which the network-side device is belonging.

It is important to clarify that the user terminal can acquire the session matching level for other adjacent cells, like C2, C3, only through the resident cell, like C1. Adjacent cells can exchange information with each other through the interfaces therebetween, such as the interface X2 of the Long Term Evolution (LTE) network. Alternately, adjacent cells can also exchange information with each other via the centralized controller, such as Radio Network Controller (RNC).

At 102, a cell selected based on the session matching level for each cell can be accessed.

For instance, a cell with the highest session matching level will be selected for accessing. Because the higher the session matching level is, the more the cell is suitable for accessing, and the higher the spectral efficiency is. Further, if there is more than one cell with "the highest session matching level", then the one with the lightest load among them should be selected. Alternately, one of the cells with "the highest session matching level" can also be randomly selected or the selection can also be performed according to other strategies, wherein the strategies can be set according to practical requirements, and the description thereof will be omitted herein.

Alternatively, after accessing to the cell with the highest session matching level, the method may further comprise a cell with the next highest session matching level is selected to be accessed if the access is failed.

In this embodiment, the cell with a next highest session matching level refers to the cell next to the cell with the highest session matching level when the cells are arranged in a descending order according to the session matching level. For instance, if the cells are arranged according to the session matching level in a descending order like C1, C2, C3 . . . Cn, C2 can be selected for accessing when the user terminal failed to access to C1.

From above, this embodiment calculates the session matching level for each cell based on a session type of a session initiated by a user terminal as needed, a session data rate available to the user terminal in each cell and load balance parameters of each cell. It is possible for the user terminal to flexibly select an appropriate cell to access based on the session matching level, in order to accommodate to various load conditions. Since the user terminal can select the most appropriate cell in the network to access, the occurrence of a poor quality of conversation caused by accessing to an overloaded cell will be avoided, which is beneficial for reducing the call dropping rate/blocking rate and increasing the spectral efficiency.

Embodiment 2

This embodiment of the present disclosure will be described from the perspective of a network-side device. Specifically, the network-side device may refer to a device like base station of a cell (hereafter, simply referred as cell) and the like.

A method for accessing to a mobile communication network comprises: acquiring a session type of a session initiated by a user terminal as needed, a session data rate available to the user terminal in the serving cell and load balance parameters of the serving cell; calculating the session matching level for the serving cell based on the acquired session type, the session data rate available to the user terminal in the serving cell and the load balance parameters of the serving cell; transmitting the session matching level to the user terminal so that the user terminal can access to a cell selected according to the received session matching level; or selecting a cell for the user terminal according to the session matching level, notifying the user terminal of the selected cell so as to access to the selected cell by the user terminal. In this embodiment, the serving cell herein refers to the cell in which the network-side device resides.

Figure 2:
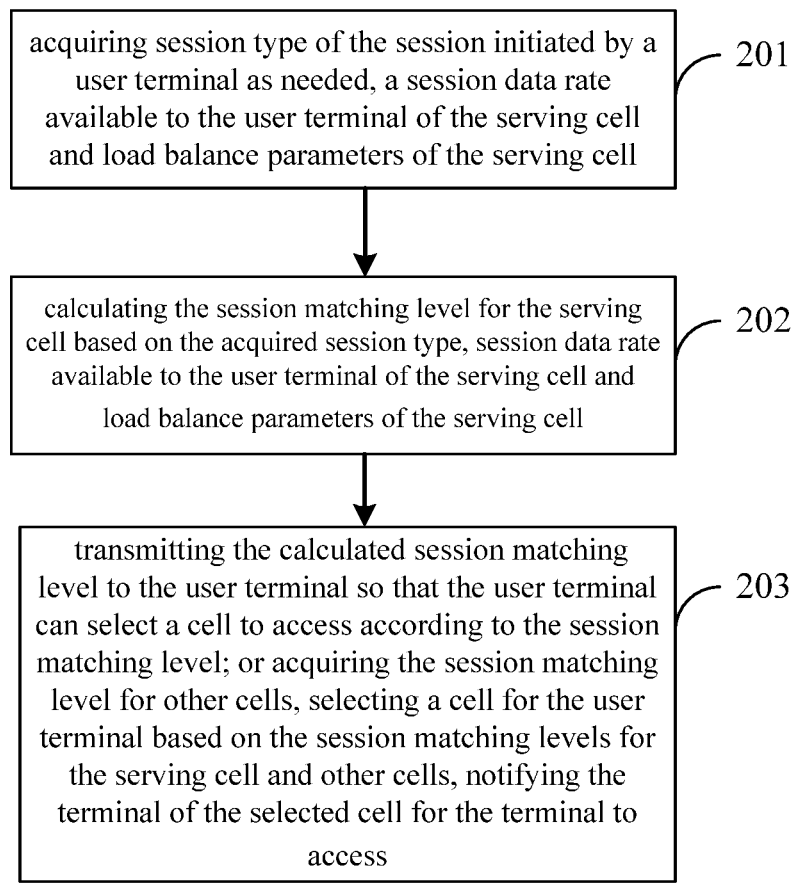
FIG. 2 is a flowchart of a method for accessing to a mobile communication network according to the second embodiment of the present disclosure.

FIG. 2 depicts a particular flow as follows.

At 201, a session type of a session initiated by a user terminal as needed, a session data rate available to the user terminal in the serving cell and load balance parameters of the serving cell are acquired.

For example, it is possible to acquire the session type of a session initiated by a user terminal as needed, according to which a RAT session support level of the session type in each cell, a session data rate available to the user terminal in each cell and load balance parameters for each cell can be acquired, wherein the load balance parameters include switching factors, frequency migration factors and the like.

In this embodiment, "the session data rate available to the user terminal" can be calculated based on the SINR of the path from the user terminal to a base station and the minimum resource unit allocated to the session by the cell, which can be expressed as the following expression:

$$R_{c,u} = W_{c,s} \log_2(1+SINR_{c,u});$$

wherein $R_{c,u}$ is the data rate of session S available to user terminal U in cell C, $SINR_{c,u}$ is the Signal to Interference plus Noise Ratio of the path from the user terminal to a base station, $W_{c,s}$ is the minimum resource unit allocated to session S by cell C.

At 202, the session matching level for the serving cell can be calculated based on the acquired session type, session data rate available to the user terminal in the serving cell and the load balance parameters of the serving cell.

For example, if the RAT session support level of the serving cell, the session data rate available to the user terminal in the serving cell and the switching factor and frequency migration factor of the serving cell and the like have been acquired in step 201, in the current step (i.e. step 202), it is possible to calculate the RAT session support level of the session type in each cell, the session data rate available to the user terminal in the serving cell, switching factors and frequency migration factors of the serving cell and the like, which can be expressed as the following expression:

$$M_{s,c,u} = M_{rat,s} R_{c,u} (1+a_{c,ss}-a_{c,ho});$$

wherein $M_{s,c,u}$ the session matching level obtained when user terminal U conducts a session S; $M_{rat,s}$ denotes the RAT session support level of the session type in each cell; $R_{c,u}$ denotes the data rate of session S available to user terminal U in cell C; $a_{c,ss}$ denotes a frequency migration factor; $a_{c,ho}$ denotes a switching factor.

At 203, the session matching level calculated in step 202 can be transmitted to the user terminal, in order for the user terminal to access to the cell selected based on the received session matching level for each cell.

After the user terminal has received the session matching level transmitted from respective cells in the network, an appropriate cell can be selected for accessing based on the received session matching level. For instance, a cell with the highest session matching level can be selected for accessing, and so on.

Of course, for a purpose of saving network resources, a cell can also be selected for the user terminal by the network-side device according to the session matching level, then the user terminal is notified the selected cell in order for the user terminal to access to this cell, that is: acquiring session matching levels transmitted by other cells, selecting a cell for the user terminal according to the session matching levels of the serving cell and other cells, notifying the user terminal of the selected cell so as to access to the selected cell by the user terminal.

From above, this embodiment discloses that the network-side device calculates the session matching level for the serving cell based on the session type of the session initiated by a user terminal as needed, the session data rate available by the user terminal in the serving cell and the load balance parameters of the serving cell. Then the session matching level is transmitted to the user terminal, so that the user terminal can flexibly select a suitable cell to access, in order to adapt to various load conditions. Since the user terminal may select the most appropriate cell in the network to access, the occurrence of a poor quality of conversation caused by accessing to an overloaded cell will be avoided, which is beneficial for reducing the call dropping rate/blocking rate and increasing the spectral efficiency.

Embodiment 3

Further, based on Embodiment 2, in order to control adverse effects caused by the switching and improve the spectral efficiency, it is possible to adjust load balance parameters, i.e. frequency migration factor $a_{c,ss}$ and switching factor $a_{c,ho}$. Thereafter, the session matching level for the serving cell can be calculated according to the acquired session type, session data rate available to the user terminal, and adjusted frequency migration factor $a_{c,ss}$ and switching factor $a_{c,ho}$, so that the system can automatically optimize the cell selection performed by a user. For instance, the frequency migration factor $a_{c,ss}$ will be adjusted if the spectrum possessed by a cell or the load of a cell changes; while the switching factor $a_{c,ho}$ will be adjusted if sessions in the cell switches frequently.

(1) Frequency Migration Factor $a_{c,ss}$

The frequency migration factor $a_{c,ss}$ can be adjusted according to the spectrum resource available in the cell; for instance, particularly in the following way: when the spectrum resource available in the cell exceeds a preset first available spectrum resource threshold value $S_{thr1,c}$, the frequency migration factor $a_{c,ss}$ will be increased according to the preset strategies; when the spectrum resource available in the cell is less than a preset second available spectrum resource threshold value $S_{thr2,c}$, the frequency migration factor $a_{c,ss}$ will be decreased according to the preset strategies; wherein the first available spectrum resource threshold value $S_{thr1,c}$ is larger than the second available spectrum resource threshold value $S_{thr2,c}$. The switching factor should be adjusted in a certain range and magnitude for adjustment, e.g. the range for adjustment can be set to $-1 \leq a_{c,ss} \leq 1$, and the magnitude for adjustment can be set to a step of ±0.01 at a time when adjusting. Of course, the first available spectrum resource threshold value $S_{thr1,c}$, the second available spectrum resource threshold value $S_{thr2,c}$ as well as the range and magnitude for adjustment are configured according to the conditions of the network.

The adjustment of the frequency migration factor $a_{c,ss}$ will be explained below by way of example.

The frequency migration factor will be adjusted if the spectrum possessed by a cell or the load of a cell changes. It will be adjusted according to the spectrum resource available in a cell $S_c = F_{rat,c}(1-L_c)$ if the initial value of the frequency migration factor is set to $a_{c,ss}=0$, wherein $F_{rat,c}$ is the spectrum occupying factor in a cell; $L_c$ is the load of cell C, $0 \leq L_c \leq 1$.

It indicates that more users can be accepted by the cell if $F_{rat,c}$ becomes larger or $L_c$ becomes smaller. Thus, when $S_c \geq S_{thr1,c}$, the frequency migration factor $a_{c,ss}$ of the cell becomes larger so that the session matching level for the cell becomes larger, and more users will be allowed to access.

It indicates that the number of users which can be accepted by the cell is limited due to a heavier load, if $F_{rat,c}$ becomes smaller or $L_c$ becomes larger. Therefore, when $S_c \leq S_{thr2,c}$, the frequency migration factor $a_{c,ss}$ of the cell will become smaller, so the session matching level for the cell becomes smaller, accessing performed by users will be controlled, which will prevent a further aggravation of the load in the cell.

(2) Switching Factor $a_{c,ho}$

The switching factor $a_{c,ho}$ can be adjusted according to the number of switching times for a session in the cell; for instance, particularly in the following way: when the number of switching times for a session in the cell exceeds a preset first session switching time threshold value $H_{thr1}$, the switching factor $a_{c,ho}$ will be decreased according to the preset strategies; when the number of switching times for the sessions in the cell is smaller than a preset second session switching time threshold value $H_{thr2}$, the switching factor $a_{c,ho}$ will be increased according to the preset strategies; wherein the first session switching time threshold value $H_{thr1}$ is larger than the second session switching time threshold value $H_{thr2}$. The switching factor $a_{c,ho}$ should be adjusted in a certain range and magnitude for adjustment, e.g. the range for adjustment can be set to $-1 \leq a_{c,ho} \leq 1$, and the magnitude for adjustment can be set to a step of ±0.01 at a time when adjusting, and so on. Of course, the first session switching time threshold value $H_{thr1}$, the second session switching time threshold value $H_{thr2}$, the range and magnitude for adjustment are configured according to the conditions of the network.

The adjustment of the switching factor $a_{c,ss}$ will be explained below by way of example.

The switching factor will be adjusted if a session in a cell switches frequently. It will be adjusted according to the number of times for switching during a period of time T, i.e. the switching frequency $$H_c = \frac{T_{ho,c}}{T},$$

if the initial value of the switching factor is set to $a_{c,ho}=0$, wherein $T_{ho,c}$ is the value of the switching counter which is used for counting the number of times for switching in the serving cell. For instance, the value of the switching counter $T_{ho,c}$ pluses 1 once a switching is occurred.

It indicates that the switching of a session in this cell is excessively frequent when $H_c \geq H_{thr1}$. Thus, the switching factor $a_{c,ho}$ of this cell will be reduced, thereby the session matching level for this cell will become larger, then users may tend to access to this cell. Thus the switching times can be controlled in this way.

It indicates that the switching of the session in this cell is little when $H_c \leq H_{thr2}$. Thus the switching factor $a_{c,ho}$ of this cell will be increased, thereby the session matching level for this cell will become smaller, users may tend to access to adjacent cells. Thus the load of the whole system can be balanced.

Certainly, the above mentioned adjustment to the frequency migration factor and switching factor not only can be adapted by the network-side device itself, but can also be adjusted by a maintainer, i.e. the values of the frequency migration factor and switching factor can be set according to the current conditions of the network, and the description thereof will be omitted herein.

In this embodiment, the available spectrum resource can be acquired by acquiring the load information of the serving cell and adjacent cells; calculating the spectrum resource available in the serving cell and adjacent cells respectively based on the load information of the serving cell and adjacent cells.

Further, according to the load information of the serving cell and adjacent cells, it is possible to set the first available spectrum resource threshold value, the second available spectrum resource threshold value, the first session switching time threshold value and the second session switching time threshold value of the serving cell. Or, the first available spectrum resource threshold value, the second available spectrum resource threshold value, the first session switching time threshold value and the second session switching time threshold value of the serving cell can be acquired from the Operation Administration and Maintenance (OAM) as well. Take an example that the network-side device is a base station, particularly: the SON entities of a base station acquires, by interaction, the load information of the serving cell and adjacent cells collected in a predetermined period of time T, the load information including the spectrum currently possessed and corresponding maximum power, occupied spectrum and transmission power; or, the base station of the serving cell acquires the load information of adjacent cells via an centralized controller in the network, such as OAM.

After acquiring the load information of the serving cell and adjacent cells collected in a predetermined period of time T, the base station calculates the resource $S_c=F_{rat,c}(1-L_c)$ available in the cell and adjacent cells based on these load information, and sets the spectrum adjusting threshold value $S_{thr1,c}$, $S_{thr2,c}$ and switching threshold value for adjustment $H_{thr1}$, $H_{thr2}$. Certainly, the spectrum threshold value for adjustment $S_{thr1,c}$, $S_{thr2,c}$ and switching threshold value for adjustment $H_{thr1}$, $H_{thr2}$ can also be acquired from a centralized controller in the network, such as OAM.

Alternatively, in this embodiment, the spectrum threshold value for adjustment can be set to:

$$S_{thr1,c} = \frac{1}{N+1}\sum_{c=0}^{N} S_c + \frac{1}{N+1}\sqrt{\sum_{c=0}^{N}\left(S_c - \frac{1}{N+1}\sum_{c=0}^{N} S_c\right)^2}$$

$$S_{thr2,c} = \frac{1}{N+1}\sum_{c=0}^{N} S_c - \frac{1}{N+1}\sqrt{\sum_{c=0}^{N}\left(S_c - \frac{1}{N+1}\sum_{c=0}^{N} S_c\right)^2}$$

wherein N is the number of adjacent cells, $$\frac{1}{N+1}\sum_{c=0}^{N} S_c$$

is an average spectrum resource available in the cell, $$\frac{1}{N+1}\sqrt{\sum_{c=0}^{N}\left(S_c - \frac{1}{N+1}\sum_{c=0}^{N} S_c\right)^2}$$

is the square error of the available spectrum resource.

The SON entity of a base station transmits to the users who resident in the serving cell the parameters such as spectrum factor and switching factor, according to which a user can calculate the session matching level for the serving cell and adjacent cells, then select a cell when the user requests for a service and needs to initiate a session.

After the cell selection has been performed by the user, relative base station updates corresponding load information, the spectrum factor and switching factor, and performs statistic on the load information in the next period of time T.

From above, the present embodiment not only can achieve the beneficial effects of Embodiment 2, but also can adjust the session matching level for the cell by adaptively adjusting the load balance parameters, i.e. the frequency migration factor $a_{c,ss}$ and the switching factor $a_{c,ho}$, in order to control the number of times that the user migrates and to reduce the number for switching, so that the load of the whole system can be balanced, which is beneficial for reducing the call dropping rate/blocking rate, increasing the spectral efficiency, and thus improve the user experience.

Embodiment 4

Further, based on Embodiment 2, during the process for selecting a cell, if the cell is selected but there is no spectrum resource available due to a heavy load in the cell, it is possible to borrow spectrum resource from adjacent cells, i.e. to determine whether there is any unused spectrum resource available in the adjacent cells. If so and the spectrum resource can satisfy the requirements of the session conducted by a user, the serving cell may add the spectrum resource to its own spectrum resource, the spectrum resource in total will be provided to the session, and be transmitted in the highest available transmission power. That is, based on Embodiment 2, the method for accessing to a mobile communication network further comprises: acquiring unused spectrum resource available in adjacent cells when there is no spectrum resource available in the serving cell; providing the unused spectrum resource to the session when determined that the acquired unused spectrum resource from adjacent cells satisfies the predetermined requirements of the session.

In this embodiment, when spectrum resource can be borrowed from adjacent cells, the spectrum resource to be borrowed should meet the following conditions:

$$R_{c,u} = W_{c,s}\log_2(1+SINR_{c,u}) \geq R_{req,s,u}$$

$$SINR_{c,u} = \frac{P_{c,u,max}L_{c,u}}{N}$$

wherein $R_{c,u}$ denotes the data rate of session S available to user terminal U in cell C, $W_{c,s}$ is the minimum resource unit allocated to session S by cell C. In this embodiment, since the spectrum resource is borrowed from adjacent cells, $W_{c,s}$ herein specifically refers to the spectrum resource borrowed from adjacent cells. $P_{c,u,max}$ is the highest transmission power on the borrowed spectrum in cell C, $R_{req,s,u}$ is the rate required by a user for conducting session S, $SINR_{c,u}$ is the Signal to Interference plus Noise Ratio of the path from user terminal U to base station C, $L_{c,u}$ is the path loss from user terminal U to cell C, N is noise.

If there is no unused spectrum resource in adjacent cells, or the unused spectrum resource available cannot satisfy the requirements of the session, it is possible to borrow the used spectrum resource in adjacent cells. For the borrowing of used spectrum resource, it is preferable to select the adjacent cell having a spectrum with the highest transmission power. Meanwhile, in order to guarantee the interference with the adjacent cell to be within an acceptable range, it is important to control the transmission power on the borrowed used spectrum resource. That is, the method for accessing to a mobile communication network further comprises: acquiring the used spectrum resource in adjacent cells of the serving cell in the case that there is no unused spectrum resource available in the adjacent cells, or the unused spectrum resource available cannot meet the requirements of the session; providing the used spectrum resource to the session when the acquired used spectrum resource satisfies preset strategies. In this embodiment, the preset strategies can be set according to the requirements of application, e.g., the requirements of application can be as follows: when the unused spectrum resource and used spectrum resource can be borrowed, these spectrum resource to be borrowed should satisfy the following conditions:

$$R'_{c,u} = W_{c,s}\log_2(1 + SINR_{c,u}) + W'_{c,s}\log_2(1 + SINR'_{c,u}) \geq R_{requ,s,u}$$

$$SINR'_{c,u} = \frac{P'_{c,u}L_{c,u}}{N}$$

wherein $R'_{c,u}$ denotes the data rate of session S available to user terminal U in cell C, $W_{c,s}$ is the unused spectrum resource borrowed from adjacent cells; $W'_{c,s}$ is the used spectrum resource in adjacent cells; $P'_{c,u}$ is the transmission power on the borrowed used spectrum resource in cell C; $R_{req,s,u}$ is the rate required by the user for conducting a session S, $SINR'_{c,u}$ is the Signal to Interference plus Noise Ratio of the path from the user terminal U to the base station C, $L_{c,u}$ is the pass loss from the user terminal U to the cell C, N is noise.

If there is no appropriate spectrum resource that can be borrowed by the serving cell, the user terminal will be informed so that the user terminal can select a cell with a next highest session matching level to access. If the user terminal still cannot select an appropriate cell to access after all the candidate cells have been chosen, the session request will be rejected, and the blocking rate $K_{cdr}$ will be updated, e.g. $K_{cdr}$ pluses 1, i.e. $K_{cdr}=K_{cdr}+1$. When the blocking rate $K_{cdr}$ reaches the threshold value, in order to re-access the session, it is possible to expand the spectrum or reallocate the RAT, e.g. the RAT is reconfigured to a higher spectral efficiency and so on.

From above, in addition to the beneficial effects of Embodiment 2, this embodiment can further achieve an advantage that the spectral efficiency can be improve by migrating borrowed spectrum resource when the cell is overload; only in the case that there is no spectrum resource that can be borrowed, the migration of the user terminal will be launched, i.e. perform a conventional switching. Then, it can be automatically upgraded to a RAT network with a higher spectral efficiency by expanding spectrum resource or RAT reallocation for supporting the users, when the network cannot support the users due to a heavy load. In summary, this solution can adopted to adaptively solve the problems of load imbalance. The spectral efficiency of the system can be increased under the case of guaranteeing the performance index such as call dropping rate/blocking rate. This application with its generality can be applied to homogeneous and heterogeneous networks.

According to the methods provided in the preceding embodiments, in Embodiments 5 and 6, description will be taken in the situations of, for example, single-RAT and multi-RAT respectively.

Embodiment 5

In this embodiment, explanations will be carried on in the context of single-RAT. For the case of single RAT, the RAT session support levels in cells are all the same. Thus a selection of a cell depends on the session data rate available to the user terminal, the current switching factor and frequency migration factor.

Figure 3:
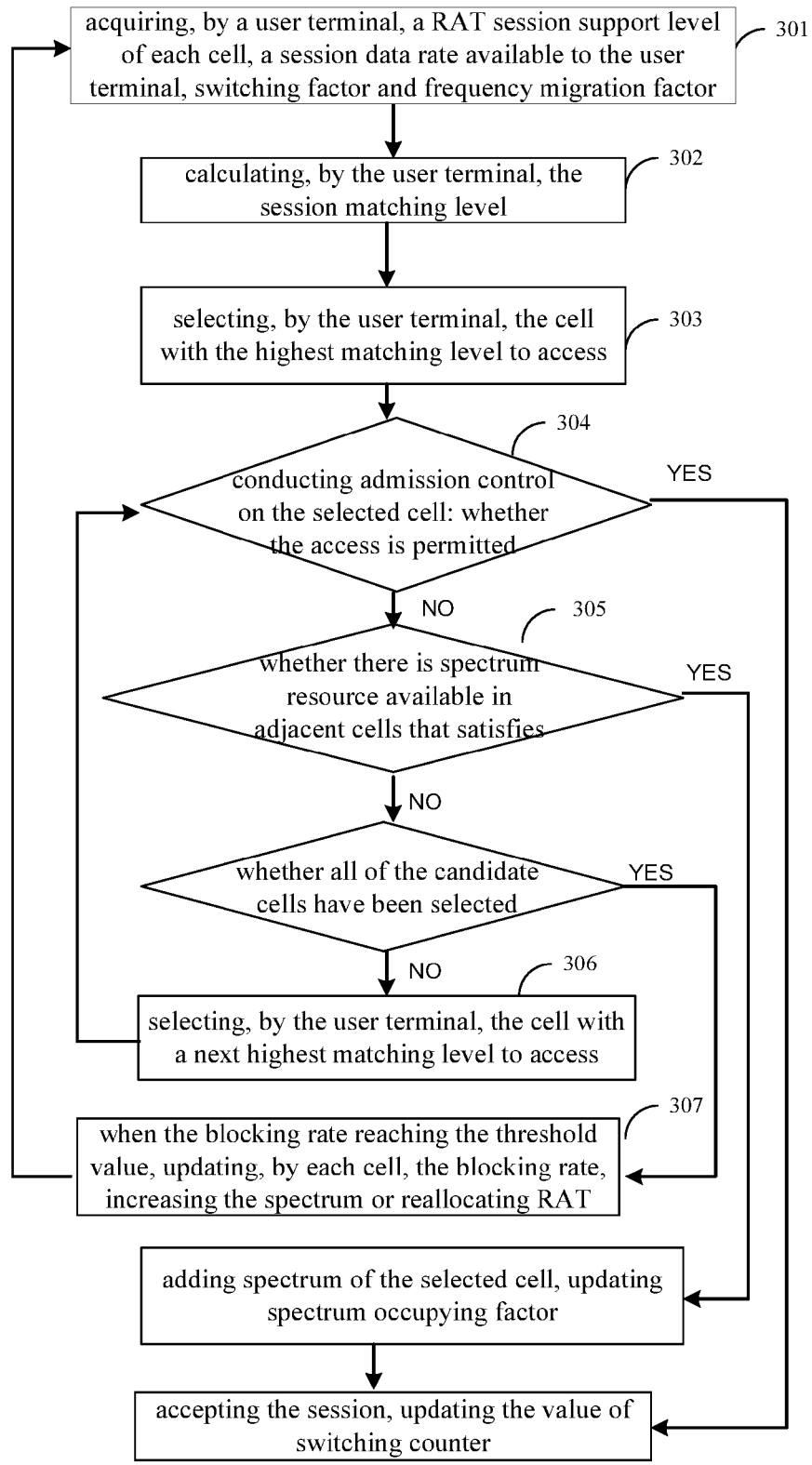
FIG. 3 is a flowchart of a method for accessing to a mobile communication network according to the fifth embodiment of the present disclosure.

For instance, in the case of single RAT, the system comprises three candidates of cells C1, C2 and C3, wherein the RAT session support levels of these three cells are the same, which is $M_{rat,s}$. The data rates of the session S available to the user terminal U in C1, C2 and C3 are $R_{c1,u}$, $R_{c2,u}$ and $R_{c3,u}$. Moreover, the frequency migration factors of C1, C2 and C3 are $a_{c1,ss}$, $a_{c2,ss}$ and $a_{c3,ss}$. The switching factors of C1, C2 and C3 are $a_{c1,ho}$, $a_{c2,ho}$ and $a_{c3,ho}$. As shown in FIG. 3, a particular process is as follows.

At 301, when the user terminal U initiates a session S, the RAT session support level of session S in each cell, session data rate available to the user terminal in each cell, and parameters such as switching factor and frequency migration factor of each cell can be acquired based on the session type of session S particularly by:

(1) with respect to cell C1—acquiring the RAT session support level $M_{rat,s}$ of session S in C1, data rate $R_{c1,u}$ of session S available to user terminal U in C1, the frequency migration factor $a_{c1,ss}$ and switching factor $a_{c1,ho}$ of C1.

(2) with respect to cell C2—acquiring the RAT session support level $M_{rat,s}$ of session S in C2, data rate $R_{c2,u}$ of session S available to user terminal U in C2, the frequency migration factor $a_{c2,ss}$ and switching factor $a_{c2,ho}$ of C2.

(3) with respect to cell C3—acquiring the RAT session support level $M_{rat,s}$ of session S in C3, data rate $R_{c3,u}$ of session S available to user terminal U in C3, the frequency migration factor $a_{c3,ss}$ and switching factor $a_{c3,ho}$ of C3.

Particularly, these parameters can be acquired in a manner that each cell delivers to one another its own RAT session support level, session data rate available to the user terminal, switching factor, frequency migration factor and the like, then RAT session support level, session data rate available to the user terminal, switching factor, frequency migration factor and the like will be distributed by the cell in which the user terminal U is resident in a broadcast manner, in order to be received by user terminal U. Also, user terminal U can issue an acquisition request, then the cell in which the user terminal U is resident will distribute corresponding parameters to user terminal U according to the acquisition request after the request is received. Certainly, other methods can be used, and the description thereof will be omitted herein.

At 302, user terminal U calculates the session matching level of session S for each cell according to the acquired RAT session support level in each cell, session data rate available to the user terminal in each cell, the switching factor and frequency migration factor of each cell particularly by:

(1) with respect to cell C1—According to the acquired $M_{rat,s}$, $R_{c1,u}$, $a_{c1,ss}$ and $a_{c1,ho}$, user terminal U calculates the session matching level $M_{s,c1,u}$ of session S in C1 by the expression $M_{s,c1,u}=M_{rat,s}R_{c1,u}(1+a_{c1,ss}-a_{c1,ho})$ as:

$$M_{s,c1,u}=M_{rat,s}R_{c1,u}(1+a_{c1,ss}-a_{c1,ho}).$$

(2) with respect to cell C2—According to the acquired $M_{rat,s}$, $R_{c2,u}$, $a_{c2,ss}$ and $a_{c2,ho}$ user terminal U calculates the session matching level $M_{s,c2,u}$ of session S in C2 by the expression $M_{s,c,u}=M_{rat,s}R_{c,u}(1+a_{c,ss}-a_{c,ho})$ as:

$$M_{s,c2,u}=M_{rat,s}R_{c2,u}(1+a_{c2,ss}-a_{c2,ho}).$$

(3) with respect to cell C3—According to the acquired $M_{rat,s}$, $R_{c3,u}$, $a_{c3,ss}$ and $a_{c3,ho}$, user terminal U calculates the session matching level $M_{s,c3,u}$ of session S in C3 by the expression $M_{s,c,u}=M_{rat,s}R_{c,u}(1+a_{c,ss}-a_{c,ho})$ as:

$$M_{s,c3,u}=M_{rat,s}R_{c3,u}(1+a_{c3,ss}-a_{c3,ho})$$

It should be further explained that the session matching level can be also calculated by the network-side device, and then transmitted to the user terminal. The method of this calculation will be consistent with the one used on the user terminal side, see Embodiment 1 for details, and the description thereof will be omitted herein. For the convenience of description, the following embodiments are explained in the case that the session matching level is calculated by user terminal.

At 303, user terminal U selects the cell with the highest matching level to access.

For instance, if the session matching level calculated in step 302 is: $M_{s,c1,u} > M_{s,c2,u} > M_{s,c3,u}$, the user terminal U selects the cell corresponding to the $M_{s,c1,u}$, i.e. C1, to access.

It should be further explained that if there is a plurality of cells having the same session matching level, the cell with the lightest load among them will be selected to access, for instance, if $M_{s,c1,u}$ and $M_{s,c2,u}$ are the same, while the load of cell C1 corresponding to $M_{s,c1,u}$ is lighter than that of the cell C2 corresponding to $M_{s,c2,u}$, the user terminal may select C1 to access.

At 304, the selected cell performs Admission Control (AC). It indicates that the session is admitted if the access is permitted, then the user terminal U may access to the selected cell. At this point, the selected cell updates the value of switching counter $T_{ho,c}$. Then the process ends.

For example, if the user selects C1 at step 303, C1 will take a charge of the admission control on session S initiated by user terminal U in this step (i.e. step 304). If the access is permitted, user terminal U will access to C1. Thereafter, C1 updates the value of switching counter $T_{ho,c}$, e.g. adding 1 to $T_{ho,c}$. Then, the process ends.

Certainly, if the access is not permitted, i.e. the access is failed, the process will proceed to step 305.

In this embodiment, the switching counter is used for counting the number of switching times within a cell, in a purpose of adjusting the load balance parameters (specifically refers to the switching factor of the load balance parameters). The specific method for adjustment refers to Embodiment 3, and the description thereof will be omitted herein.

At 305, if it is not permitted to access to the selected cell, the selected cell seeks for unused spectrum resource in adjacent cells, and judges whether the spectrum resource sought out can satisfy the requirements of session S. If so, C1 adds the spectrum resource sought out into its own spectrum resource, and updates the spectrum occupying factor $F_{rat,c}$ of the cell. Then C1 provides the newly added spectrum resource to session S, updates the value of switching counter $T_{ho,c}$. Then, the process ends. If the spectrum resource sought out cannot satisfy the requirements of the session, user terminal U will be informed to select the cell with the next highest matching level. Then, the process proceeds to step 306.

For instance, in the case that the selected cell is C1, C1 will attempt to find unused spectrum resource available in adjacent cells due to a lack of spectrum resource in C1, when C1 performs the admission control on session S. If the spectrum resource available in adjacent cells can satisfy the requirements of session S, C1 will adds to its own spectrum resource list the spectrum resource sought out which can meet the requirements of session S, update the spectrum occupying factor $F_{rat,c}$ of the cell, and then provide the newly added spectrum resource to session S. Then, the process ends. If the spectrum resource available in adjacent cells cannot satisfy session S, C1 will notify the user terminal U to select the cell with the next highest matching level. Then the process proceeds to step 306.

At 306, the user terminal judges whether selection for all the candidate cells have been completed. If not, the cell with the next highest matching level will be selected, and then returns to step 304; if so, the session request will be rejected, or the process will proceed to step 307.

For instance, if the session matching level calculated in step 302 is: $M_{s,c1,u} > M_{s,c2,u} > M_{s,c3,u}$, user terminal U selects cell C2 with the next highest matching level next to C1, and then returns back to step 304. If there is no appropriate cell to access after all the candidate cells have been chosen, the session request will be rejected, or the process will proceed to step 307.

At 307, the blocking rate $K_{cdr}$ of each cell will be updated, e.g. $K_{cdr}$ pluses 1, i.e. $K_{cdr} = K_{cdr} + 1$. When the blocking rate $K_{cdr}$ reaches the threshold value, in order to re-access to the session S, the spectrum will be expanded or the RAT will be reallocated, e.g. it is reconfigured to be the RAT with a higher spectral efficiency and so on.

From above, this embodiment calculates the session matching level for each cell according to the RAT session support level of each cell, session data rate available to the user terminal in each cell and parameters like switching factor and frequency migration factor of each cell, so that the user terminal can flexibly select an appropriate cell to access based on the session matching level for each cell, and thereby be suitable for various load conditions. Since the user terminal may select the most appropriate cell in the network to access, the occurrence of a poor quality of conversation caused by accessing to an overloaded cell will be avoided, which is beneficial for reducing the call dropping rate/blocking rate and increasing the spectral efficiency.

Further, when the cell is overloaded, the spectral efficiency can also be improved by borrowing spectrum resource; the migration of the user terminal will be launched only when there is no spectrum resource that can be borrowed, and when the network cannot support the utilizations by users due to a heavy load in the network. It can be automatically upgraded to a RAT network with a higher spectral efficiency by increasing spectrum resource or RAT reallocation for supporting the utilizations by users.

In summary, this solution can adaptively solve the problems caused by load imbalance. The spectral efficiency of a system can be increased under the case of guaranteeing the performance index such as call dropping rate/blocking rate. This application with its generality can be applied to homogeneous and heterogeneous networks.

Embodiment 6

In this embodiment, explanations will be made in terms of multi-RAT. In the context of multi-RAT, different RATs have different support levels for session traffic. Thus, the cell selection should account for the support level of session traffic by RAT, in addition to session data rate available to the user terminal in each cell and parameters like the switching factor and frequency migration factor of each cell.

Figure 4:
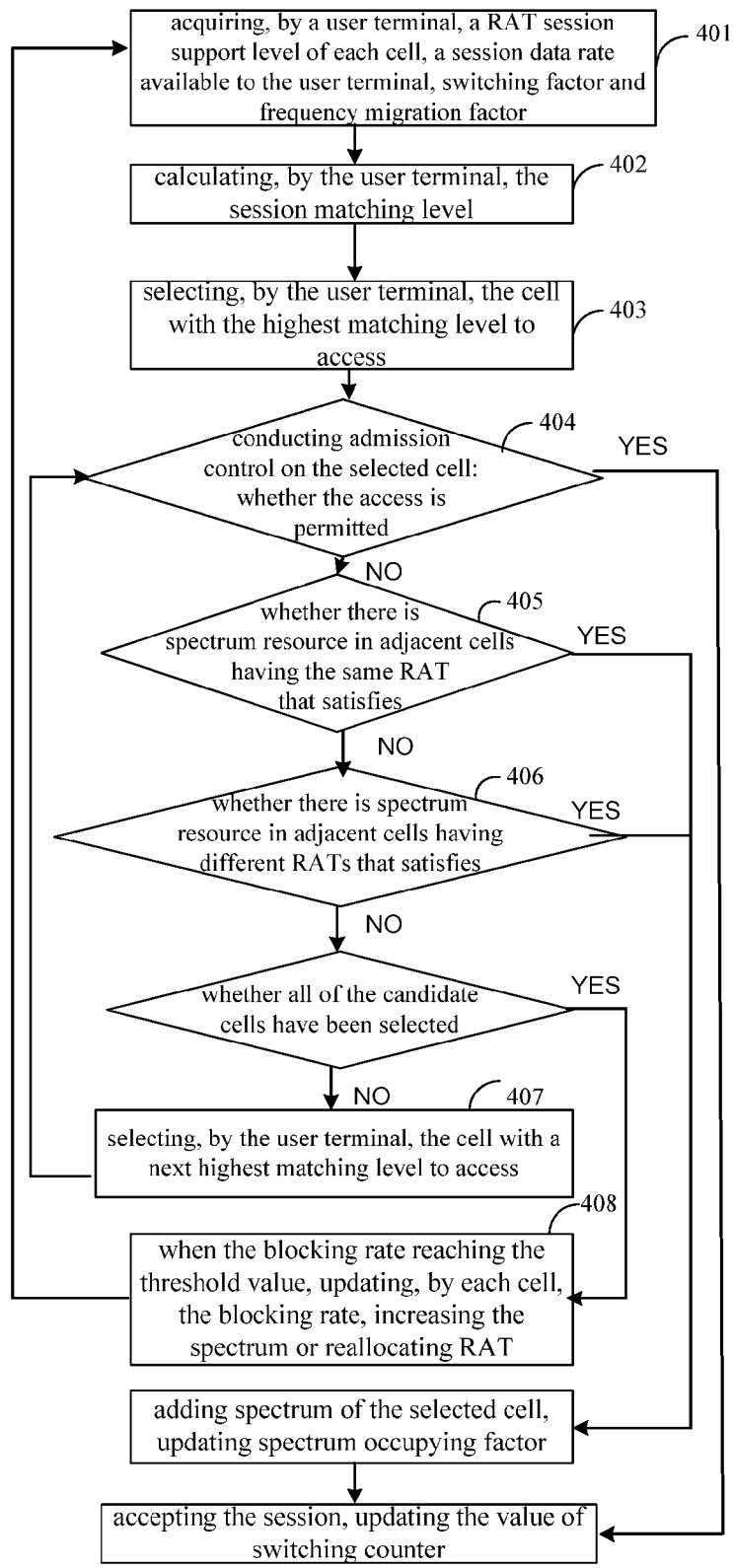
FIG. 4 is a flowchart of a method for accessing to a mobile communication network according to the sixth embodiment of the present disclosure.

For instance, in the context of multi-RAT, the system comprises three candidate cells of C1, C2 and C3, wherein the RAT session support levels of these three cells are $M_{rat1,s}$, $M_{rat2,s}$ and $M_{rat3,s}$ respectively, the data rate of session S available to user terminal U in C1, C2 and C3 are $R_{c1,u}$, $R_{c2,u}$ and $R_{c3,u}$ respectively. Moreover, the frequency migration factors of C1, C2 and C3 are $a_{c1,ho}$, $a_{c2,ho}$, and $a_{c3,ho}$. The switching factors of C1, C2 and C3 are $a_{c1,ho}$ $a_{c2,ho}$ and $a_{c3,ho}$. As shown in FIG. 4, a particular process is as follows.

At 401, when user terminal U initiates a session S, the RAT session support level of each cell, session data rate available to the user terminal in each cell, and parameters like switching factor and frequency migration factor of each cell can be acquired based on the session type of the session S particularly by:

(1) with respect to cell C1—acquiring the RAT session support level $M_{rat,s}$ of session S in C1, data rate $R_{c1,u}$ of the session S available to user terminal U in C1, the frequency migration factor $a_{c1,ss}$ and switching factor $a_{c1,ho}$ of C1.

(2) with respect to cell C2—acquiring the RAT session support level $M_{rat,s}$ of session S in C2, data rate $R_{c2,u}$ of the session S available to user terminal U in C2, the frequency migration factor $a_{c2,ss}$ and switching factor $a_{c2,ho}$ of C2.

(3) with respect to cell C3—acquiring the RAT session support level $M_{rat,s}$ of session S in C3, data rate $R_{c3,u}$ of the session S available to user terminal U in C3, the frequency migration factor $a_{c3,ss}$ and switching factor $a_{c3,ho}$ of C3.

Particularly, these parameters can be acquired in a manner that each cell delivers to one another its own RAT session support level, session data rate available to the user terminal, switching factor, frequency migration factor and the like, then the RAT session support level, session data rate available to the user terminal, switching factor, frequency migration factor and the like will be distributed by the cell in which the user terminal U is resident in a broadcast manner in order to be received by user terminal U. Also, user terminal U can issue an acquisition request, then the cell in which user terminal U is resident can distribute corresponding parameters to user terminal U according to the acquisition request after the request is received. Certainly, other methods can be also used, and the description thereof will be omitted herein.

At 402, user terminal U calculates the session matching level of session S for each cell according to the acquired RAT session support level of session S in each cell, session data rate available to the user terminal in each cell, the switching factor and frequency migration factor of each cell particularly by:

(1) with respect to cell C1—According to the acquired $M_{rat,s}$, $R_{c1,u}$, $a_{c1,ss}$ and $a_{c1,ho}$, user terminal U calculates the session matching level $M_{s,c1,u}$ of session S in C1 by the expression $M_{s,c1,u}=M_{rat,s}R_{c1,u}(1+a_{c1,ss}-a_{c1,ho})$ as:

$$M_{s,c1,u}=M_{rat,s}R_{c1,u}(1+a_{c1,ss}-a_{c1,ho}).$$

(2) with respect to cell C2—According to the acquired $M_{rat,s}R_{c2,u}$, $a_{c2,ss}$ and $a_{c2,ho}$, user terminal U calculates the session matching level $M_{s,c2,u}$ of session S in C2 by the expression $M_{s,c,u}=M_{rat,s}R_{c,u}(1+a_{c,ss}-a_{c,ho})$ as:

$$M_{s,c2,u}=M_{rat,s}R_{c2,u}(1+a_{c2,ss}-a_{c2,ho}).$$

(3) with respect to cell C3—According to the acquired $M_{rat,s}$, $R_{c3,u}$, $a_{c3,ss}$ and $a_{c3,ho}$, user terminal U calculates the session matching level $M_{s,c3,u}$ of session S in C3 by the expression $M_{s,c,u}=M_{rat,s}R_{c,u}(1+a_{c,ss}-a_{c,ho})$ as:

$$M_{s,c3,u}=M_{rat,s}R_{c3,u}(1+a_{c3,ss}-a_{c3,ho})$$

It should be further explained that the session matching level can also be calculated by the network-side device, then transmitted to the user terminal, and the description thereof will be omitted herein.

At 403, user terminal U selects the cell with the highest matching level to access. For instance, if the session matching level calculated in step 302 is: $M_{s,c1,u}>M_{s,c2,u}>M_{s,c3,u}$, user terminal U selects the cell corresponding to the $M_{s,c1,u}$, i.e. C1, to access.

It should be further explained that if there is a plurality of cells having the same session matching level, the cell with the lightest load among them will be selected to access.

At 404, the selected cell performs AC. It indicates that the session is admitted if the access is permitted, then user terminal U may access to the selected cell. At this point, the selected cell updates the value of switching counter $T_{ho,c}$. Then the process ends.

For instance, if the user selects C1 at step 403, C1 will take a charge of the admission control on session S initiated by the user terminal U in this step (i.e. step 404). If the access is permitted, user terminal U will access to C1. Thereafter, C1 updates the value of switching counter $T_{ho,c}$, e.g. adding 1 to $T_{ho,c}$. Then, the process ends.

Certainly, if the access is not permitted, i.e. the access is failed, the process will proceed to step 305.

In this embodiment, the switching counter is used for counting the number of switching times within a cell, in a purpose of adjusting the load balance parameters (specifically refers to the switching factor of the load balance parameters). The specific method for adjustment refers to Embodiment 3, and the description thereof will be omitted herein.

At 405, if it is not permitted to access to the selected cell, the selected cell seeks for unused spectrum resource available in adjacent cells having the same RAT (i.e. adjacent cells with the same RAT), and judges whether the spectrum resource sought out can satisfy the requirements of session S. If so, C1 adds the spectrum resource sought out into its own spectrum resource, and updates the spectrum occupying factor $F_{rat,c}$ of the cell. Then C1 provides the newly added spectrum resource to session S. Then, the process ends. If the spectrum resource sought out cannot meet the requirements of the session, the process will proceed to step 406.

At 406, the selected cell seeks for unused spectrum resource in adjacent cells having different RATs (i.e. adjacent cells with different RATs), and judges whether the spectrum resource sought out can satisfy the requirements of session S. If so, C1 adds the spectrum resource sought out into its own spectrum resource, and updates the spectrum occupying factor $F_{rat,c}$ of the cell. Then C1 provides the newly added spectrum resource to session S, updates the value of switching counter $T_{ho,c}$. Then, the process ends. If the spectrum resource sought out cannot satisfy the requirements of the session, user terminal U will be informed to select the cell with the next highest matching level. Then, the process proceeds to step 407.

At 407, the user terminal selects the cell with the next highest matching level, and then returns to step 404.

If there is no appropriate cell that can be accessed after all the candidate cells have been chosen, the session request will be rejected, or the process will proceed to step 408.

At 408, the blocking rate $K_{cdr}$ of each cell will be updated, e.g. $K_{cdr}$ pluses 1, i.e. $K_{cdr}=K_{cdr}+1$. When the blocking rate $K_{cdr}$ reaches the threshold value, the spectrum will be increased or the RAT will be reallocated, e.g. it will be reconfigured to be the RAT with a higher spectral efficiency and so on, in order to re-access to the session S.

The present example has the same beneficial effects as Embodiment 5. The difference therebetween is that this embodiment is applied to the case of multi-RAT, while Embodiment 5 is applied to the case of single RAT.

Embodiment 7

Figure 5A:
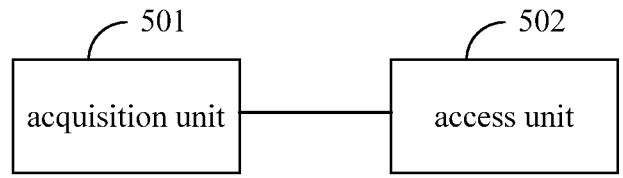
FIG. 5A is a structural schematic of a user terminal according to the embodiments of the present disclosure.

In order to implement the methods mentioned above in a better manner, embodiments of the present disclosure provide a user terminal correspondingly. As shown in FIG. 5A, the user terminal comprises acquisition unit 501 and access unit 502.

The acquisition unit 501 is configured to acquire a session matching level for each cell.

The access unit 502 is configured to access to a cell selected based on the session matching level for each cell acquired by the acquisition unit 501.

In this embodiment, the session matching level is acquired based on a session type of the session initiated by a user terminal as needed, a session data rate (corresponding to the signal strength) available to the user terminal in each cell and load balance parameters of each cell. The session matching level can be calculated either by the user terminal or the network-side device, i.e. the acquisition unit 501 is particularly configured to acquire the session matching level for each cell. The session matching level for each cell is acquired based on the session type of the sessions initiated by the user terminal as needed, the session data rate available to the user terminal in each cell and the load balance parameters of each cell. For instance, each cell can acquire the session type of the session initiated by the user terminal as needed, and calculate its own session matching level based on the RAT session support level of this session type in each cell, the session data rate available to the user terminal in each cell, switching factors and frequency migration factors and the like in each cell.

Figure 5B:
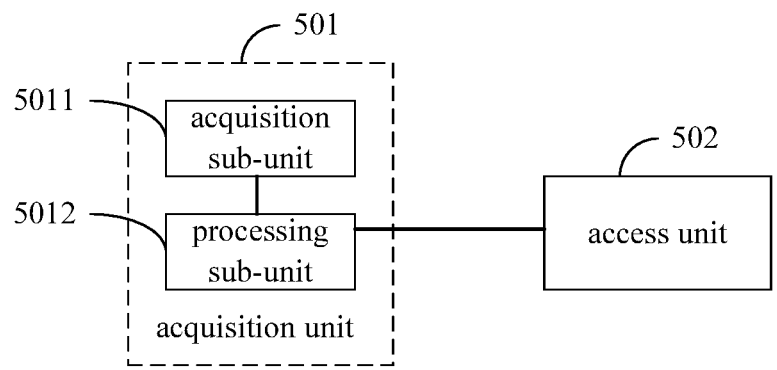
FIG. 5B is another structural schematic of a user terminal according to the embodiments of the present disclosure.

Alternately, as shown in FIG. 5B, the acquisition unit 501 may also comprise an acquisition sub-unit 5011 and a processing sub-unit 5012.

The acquisition sub-unit 5011 is configured to acquire the session type of a session initiated by the user terminal as needed, the session data rate available to the user terminal in each cell and the load balance parameters of each cell.

The processing sub-unit 5012 is configured to calculate the session matching level for each cell based on the acquired session type acquired by the acquisition sub-unit 5011, the session data rate available to the user terminal and the load balance parameters thereof.

For instance, it can be as follows: an acquisition sub-unit 5011 is particularly configured to acquire a session type of the session initiated by the user terminal as needed, a session data rate $R_{c,u}$ available to the user terminal in each cell and load balance parameters of each said cell. In this embodiment, the load balance parameters include frequency migration factor $a_{c,ss}$ and switching factor $a_{c,ho}$ According to the type of session, the radio access technology RAT session support level $M_{rat,s}$ of the session type in each cell can be acquired.

The processing sub-unit 5012 is particularly configured to calculate the session matching level in each cell according to the expression of $M_{s,c,u}$: $M_{s,c,u} = M_{rat,s} R_{c,u}(1+a_{c,ss}-a_{c,ho})$ In this embodiment, $M_{s,c,u}$ is the session matching level for each cell. Please refer to the preceding embodiments for details, and the description thereof will be omitted herein.

At this point, the access unit 502 is configured to access a cell selected according to the session matching level derived by the processing sub-unit 5012.

Alternatively, the access unit 502 is particularly configured to select the cells with the highest session matching level to access.

Alternatively, the access unit 502 is also configured to select a cell with the lightest load to be accessed among the cells with the highest session matching level if there is more than one cell with the highest session matching level. Or, the access unit 502 is configured to select randomly any one of the cells with "the highest session matching level".

Alternatively, the access unit 502 is also configured to select a cell with a next highest session matching level to access if an access failure is occurred. In this embodiment, the cell with a next highest session matching level refers to the cell next to the cell with the highest session matching level when the cells are arranged in a descending order according to session matching level.

The specific embodiments for the abovementioned units may refer to the preceding embodiments, and the description thereof will be omitted.

The user terminal specifically can be a mobile phone, a laptop or a PC and the like.

From above, this embodiment calculates the session matching level for each cell according to a session type of a session initiated by a user terminal as needed, a session data rate available to the user terminal in each cell and load balance parameters of each cell, so that the acquisition unit 501 of the user terminal can acquire the session matching level. After that, the access unit 502 can flexibly select an appropriate cell to access based on the session matching level for each cell, in order to adapt to various load conditions. Since the user terminal can select the most appropriate cell in the network to access, the occurrence of a poor quality of conversation caused by accessing to an overloaded cell will be avoided, which is beneficial for reducing the call dropping rate/blocking rate and increasing the spectral efficiency.

Embodiment 8

Figure 6A:
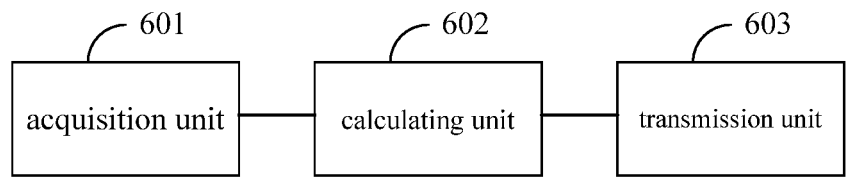
FIG. 6A is a structural schematic of the network-side device according to the embodiments of the present disclosure.

Correspondingly, the embodiments of the present disclosure also provide a network-side device. As shown in FIG. 6A, the network-side device comprises an acquisition unit 601, a calculating unit 602 and a transmission unit 603.

The acquisition unit 601 is configured to acquire a session type of a session initiated by the user terminal as needs, a session data rate available to the user terminal in the cell and load balance parameters of the cell.

The calculating unit 602 is configured to calculate the session matching level for the cell based on the session type, the session data rate available to the user terminal in the cell and the load balance parameters of the cell that are acquired by the acquisition unit 601.

The transmission unit 603 is configured to transmit the session matching level acquired by the calculating unit 602 to the user terminal so that the user terminal can access to a cell selected according to the session matching level for each cell.

Certainly, for a purpose of saving network resources, the network-side device can select a cell for the user terminal according to the session matching level, then notify the user terminal of the selected cell so that the user terminal can access to the selected cell. That is: the transmission unit 603 is also configured to acquire the session matching level transmitted by other cells, select a cell for the user terminal based on the session matching level for the cell and other cells, notify the user terminal of the selected cell for the user terminal to access.

In this embodiment, the load balance parameters comprise switching factor and frequency migration factor.

Thus, the acquisition unit 601 is specifically configured to acquire the session type of a session initiated by the user terminal as needed, the session data rate $R_c$ available to the user terminal in the cell as well as a switching factor $a_{c,ho}$, a frequency migration factor $a_{c,ss}$ of the cell, and also acquire the RAT session support level $M_{rat,s}$ of the session type by the cell.

The calculating unit 602 is specifically configured to calculate the session matching level for each cell based on the expression of $M_{s,c,u} = M_{rat,s} R_{c,u}(1+a_{c,ss}-a_{c,ho})$; wherein, $M_s$ the session matching level for the cell. Please refer to preceding embodiments for details, and the description thereof will be omitted herein.

Certainly, the network-side device also comprises a session unit 607.

The session unit 607 is configured to perform the admission control on the session accessing to the user terminal. When the access is permitted, the user terminal is allowed to access.

Further, in order to control the adverse effects caused by switching and to improve the spectral efficiency, it is possible to adjust the load balance parameters, i.e. frequency migration factor $a_{c,ss}$ and switching factor $a_{c,ho}$, so that the system can automatically optimize the cell selection performed by users. For instance, the frequency migration factor $a_{c,ss}$ will be adjusted if the spectrum possessed by a cell or the load of a cell changes; and the switching factor $a_{c,ho}$ will be adjusted if the session in a cell switches frequently. As shown in FIG. 6, the network-side device also comprises a first adjusting unit 604 and a second adjusting unit 605.

The first adjusting unit 604 is configured to adjust the frequency migration factor based on the spectrum resource available in the cell.

The second adjusting unit 605 is configured to adjust the switching factor based on the session switching times of the cell.

In this embodiment, the first adjusting unit 604 is particularly configured to increase the frequency migration factor according to preset strategies, when the spectrum resource available in the serving cell exceeds a preset first available spectrum resource threshold value; and to reduce the frequency migration factor according to preset strategies, when the spectrum resource available in the serving cell is less than a preset second available spectrum resource threshold value; wherein, the first available spectrum resource threshold value is larger than the second available spectrum resource threshold value.

The second adjusting unit 605 is particularly configured to reduce the switching factor according to the predetermined strategies when the number of switching times of a session in the serving cell exceeds a preset first session switching time threshold value; and to increase the switching factor according to the predetermined strategies when the number of switching times of a session in the serving cell is smaller than a preset second session switching time threshold value; wherein, the first session switching time threshold value is larger than the second session switching time threshold value.

Then the acquisition unit 601 is also configured to acquire the frequency migration factor derived by the first adjusting unit 604 and/or the switching factor of the second adjusting unit 605.

The calculating unit 602 is also configured to calculate the session matching level for the cell based on the acquired session type, the session data rate available to the user terminal in the cell and the adjusted frequency migration factor and/or switching factor.

Figure 6B:
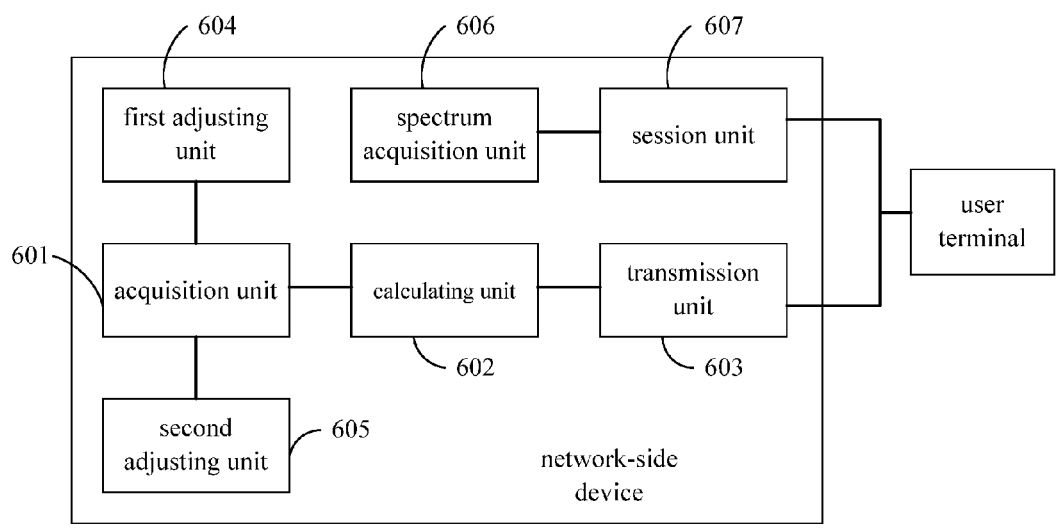
FIG. 6B is another schematic of the network-side device according to the embodiments of the present disclosure.

Further, during the selection of cells, if the selected cell is overloaded and there is no spectrum resource available, spectrum resource can be borrowed from adjacent cells. As shown in FIG. 6B, the network-side device also comprises a spectrum acquisition unit 606.

The spectrum acquisition unit 606 is configured to select the serving cell to access at the user terminal. Yet, when there is no spectrum resource available, the unused spectrum resource in the adjacent cells can be acquired.

The session unit 607 is configured to determine whether the unused spectrum resource in adjacent cells acquired by the spectrum acquisition unit 606 satisfies the preset requirements of the session, and provide the session with the unused spectrum resource.

Alternatively, the spectrum acquisition unit 606 is also configured to acquire the used spectrum resource of adjacent cells when there is no unused spectrum resource available in adjacent cells or the unused spectrum resource available cannot satisfy the requirements of the session.

The session unit 607 is also configured to provide the session with the used spectrum resource, when the used spectrum resource acquired by the spectrum acquisition unit 606 satisfy the predetermined strategies.

Further, the network-side device may also comprise a load acquisition unit and a parameter calculating unit.

The load acquisition unit is configured to acquire the load information of the serving cell and adjacent cells.

The parameter calculating unit is configured to calculate the spectrum resource available in the serving cell and adjacent cells based on the load information of the serving cell and adjacent cells. In addition or alternatively, the parameter calculating unit is also configured to set the first available spectrum resource threshold value, the second available spectrum resource threshold value, the first session switching time threshold value and the second session switching time threshold value according to the load information of the serving cell and adjacent cells. Please refer to the preceding embodiments for details, and the description thereof will be omitted herein.

Alternatively, these parameters can also be calculated and collected by other devices in addition to be calculated by using the network-side device to set the first available spectrum resource threshold value, the second available spectrum resource threshold value, the first session switching time threshold value and the second session switching time threshold value, and then the parameters can be provided to the network-side device. That is, the network-side device may also comprise a parameter acquisition unit.

The parameter acquisition unit is configured to acquire from the OAM the first available spectrum resource threshold value, the second available spectrum resource threshold value, the first session switching time threshold value and the second session switching time threshold value of the cell.

The specific implementations for the above units may refer to the preceding embodiments for details, and the description thereof will be omitted herein.

The network-side device specifically may be a base station of a cell (i.e. the cell mentioned in the preceding method embodiments).

From above, the calculating unit 602 of the network-side device in the present example can calculate the session matching level for the cell based on the RAT session support level of the cell, the session data rate available to the user terminal in the cell and parameters like switching factor and frequency migration factor of the cell. Then the transmission unit 603 transmits the session matching level to the user terminal, so that the user terminal can flexibly select an appropriate cell to access based on the session matching level, while the session matching level for the cell is changed by adaptively adjusting the load balance parameters, in order to adapt to various load conditions. Since the user terminal selects the most appropriate cell in the network to access, the occurrence of the poor quality of conversation caused by accessing to an overloaded cell will be avoided, which is beneficial for reducing the call dropping rate/blocking rate and increase the spectral efficiency.

Further, the spectral efficiency can be improved by borrowing spectrum resource by the spectrum acquisition unit when the cell is overloaded; the migration of the user terminal can be launched only when there is no spectrum resource that can be borrowed; and it can be automatically upgraded to a RAT network with a higher spectral efficiency by increasing spectrum resource or RAT reallocation for supporting the users, when the network cannot support the users due to the heavy load in the whole network.

Embodiment 9

Correspondingly, the present embodiment also provides a communication system, comprising any one of the user terminals and at least two network-side devices which are provided by the embodiments of the present application; for instance, as follows: a user terminal configured to acquire the session matching level for each cell, wherein the session matching level is calculated based on a session type of the session initiated by a user terminal as needed, a session data rate available to the user terminal in each cell and load balance parameters of each cell; select a cell to access based on the acquired session matching level. Wherein, the load balance parameters comprise the switching factor and frequency migration factor.

In this embodiment, the session matching level can be calculated by the user terminal, or by the network-side device. If the calculation is conducted by the user terminal makes, the communication specifically can be as follows: the user terminal is configured to acquire a session type of the session initiated by its own as needed, a session data rate available to the user terminal in each cell and load balance parameters of each cell; calculate the session matching level based on the session type, the session data rate available to the user terminal in each cell and the load balance parameters of each said cell.

At this point, each network-side device is configured to transmit to the user terminal the session data rate available to the user terminal in the cell (i.e. the cell in which the network-side device is resident) and the load balance parameters of the cell (i.e. the cell in which the network-side device is resident). It needs to be further explained that since the session is initiated by the user terminal, the user terminal itself may learn the session type of the session. Thus, for saving the traffic, there is no need for the network-side device to notify the user terminal of the session type of the session. Certainly, the network-side device may also transmit the session type of the session to the user terminal.

For instance, the user terminal is specifically configured to acquire the session type of the session initiated by its own as needed, according to the session type acquire the RAT session support level of the session type in each cell, a session data rate available to the user terminal in each cell and switching factors and frequency migration factors of each cell; then calculate the session matching level for the cell based on the RAT session support level of each cell, session data rate available to the user terminal in each cell and switching factors and frequency migration factors of each cell. Please refer to the preceding embodiments for details, the description thereof will be omitted herein.

If the session matching level is calculated by the network-side device, the communication system may comprise any one of network-side devices provided in the examples of the present disclosure; i.e. in addition to the communication system mentioned above, the embodiments of the disclosure also provide another kind of communication system, which comprises the user terminal and at least two network-side devices, as follows: each network-side device is configured to acquire a session type of the session initiated by the user terminal of the serving cell (i.e. the cell in which the network-side device is resident) as needed; a session data rate available to the user terminal in the cell (i.e. the cell in which the network-side device is resident) and load balance parameters of the cell; calculate the session matching level for the cell based on the session type, the session data rate available to the user terminal in the cell (i.e. the cell in which the network-side device is resident) and the load balance parameters of the cell (i.e. the cell in which the network-side device is resident), transmit the acquired session matching level to the user terminal so that the user terminal can select a cell to access based on the session matching level.

Thus at this point, the user terminal is configured to receive the session matching level transmitted by each cell, and select a cell to access based on the session matching level for each cell.

For instance, the network-side device is specifically configured to acquire a session type of the session initiated by the user terminal as needed; acquire, based on the session type, the RAT session support level of the session type by the cell, the session data rate available to the user terminal in the cell and switching factors, frequency migration factors in the cell; then calculate the session matching level for the cell based on the acquired RAT session support level of the cell, the session data rate available to the user terminal and switching factors, frequency migration factors in the cell. Please refer to the preceding embodiments for details, the description thereof will be omitted herein.

It is to be further explained that, for a purpose of saving network resources, the network-side device can select a cell for the user terminal according to the session matching level, then notify the user terminal of the selected cell so that the user terminal can access to the selected cell. That is, in addition to the communication system mentioned above, this embodiment also provides another kind of communication system, which comprises the user terminal and at least two network-side devices, as follows: each network-side device is configured to acquire a session type of the session initiated by the user terminal of the cell (i.e. the cell in which the network-side device is resident) as needed, a session data rate available to the user terminal in the cell and load balance parameters of the cell; calculate the session matching level for the cell based on the acquired session type, the session data rate available to the user terminal in the cell and the load balance parameters of the cell; acquire the session matching level for other cells; select a cell for the user terminal based on the session matching level for the cell and other cells (i.e. cells in which the other network-side devices are resident); and notify the user terminal of the selected cell; the user terminal is configured to receive the notification transmitted by the network-side device within the cell (i.e. the cell in which the user terminal is resident), wherein the notification indicate the cell selected for the user terminal; and access according to the notification, i.e. the user terminal can access to the cell selected by the network-side device.

Further, in the three communication systems mentioned above, in order to control the adverse effects caused by the switching and to improve the spectral efficiency, the frequency migration factor $a_{c,ss}$ and switching factor $a_{c,ho}$ can be adjusted, so that the system can automatically optimize the cell selection by users. That is, the network-side device is configured to adjust the frequency migration factor $a_{c,ss}$ based on the spectrum resource available in the cell, and adjust the switching factor $a_{c,ho}$ based on the session switching times of the cell; the specific adjusting method can be seen in preceding embodiments, the description thereof will be omitted herein.

Further, during the cell selection, if the cell which is overloaded is selected, and there is no spectrum resource available, the network-side device can borrow spectrum resource from adjacent cells, i.e. determine whether any available unused spectrum resource is presented in adjacent cells. If so and these spectrum resource can satisfy the requirements of the sessions by users, the cell adds these spectrum resource to its own spectrum resource, the sum of which can be supplied to the session. That is: the network-side device is configured to acquire unused spectrum resource available in adjacent cells when there is no spectrum resource available in the cell; determine whether the acquired unused spectrum resource available in adjacent cells satisfy the preset requirements of the session, and provide the session with the unused spectrum resource for use.

If there is no unused spectrum resource available in adjacent cells, or the unused spectrum resource cannot satisfy the requirements of the sessions, the used spectrum resource will be borrowed from adjacent cells in addition to the unused spectrum resource in adjacent cells. In terms of borrowing the used spectrum resource, it is preferable to select the spectrum with the highest transmission power in the adjacent cells. Meanwhile, the transmission power on the borrowed used spectrum resource is controlled, in order to guarantee the interference with the adjacent cell to be within an acceptable range. That is, the network-side device is also configured to acquire the used spectrum resource in the adjacent cell of the cell when there is no unused spectrum resource in adjacent cells, or the unused spectrum resource in the adjacent cell cannot satisfy the requirements of the sessions. If the used spectrum resource acquired satisfies the preset strategies, the spectrum resource will be provided to the session. In this embodiment, the preset strategies can be set according to the actual requirements.

The implementing for the devices mentioned above may refer to the preceding examples, the description thereof will be omitted herein.

From above, the communication system of this embodiment calculates the session matching level for each cell based on the RAT session support level of each cell, the session data rate available to the user terminal in each cell and parameters like switching factor and frequency migration factor of each cell. Then the user terminal can flexibly select an appropriate cell to access based on the session matching level for each cell, and change the session matching level for the cell by adaptively adjust the load balance parameters, in order to adapt to various load conditions. Since the user terminal may select the most appropriate cell in the network to access, the occurrence of a poor quality of conversation caused by accessing to an overloaded cell will be avoided, which is beneficial for reducing the call dropping rate/blocking rate and increasing the spectral efficiency. Further, it can also improve the spectral efficiency by borrowing spectrum resource when the cell is overloaded. The migration of the user terminal is launched only when there is no spectrum resource that can be borrowed. Also, it can be automatically upgraded to a RAT network with a higher spectral efficiency by increasing spectrum resource or RAT reallocation for supporting the users, when the network cannot support the users due to the heavy load in the whole network.

In summary, this solution can adaptively solve the problems of load imbalance, increase the spectral efficiency of the system while guaranteeing the performance index like the call dropping rate/blocking rate. This application with its generality can be applied to homogeneous and heterogeneous networks.

It is to be understood by those skilled in the art that all or parts of the steps of the various methods in the embodiments mentioned above can be accomplished in corresponding hardware in a manner of instructing by programs. The program can be stored in a readable storage medium of a computer, and the storage medium may comprise Read Only Memory (ROM), Random Access Memory (RAM), disk or Compact Disc and the like.

The foregoing descriptions of this disclosure disclose a method apparatus and system for accessing to a mobile communication network has been described in detail. Several embodiments are applied to illustrate the concepts and implementations of the disclosure in the document. However, the embodiments of the disclosure are only used to improve the understanding of the methods and core ideas. Meanwhile, it will be understood by those of ordinary skill in the art that various changes in forms of implementation and the range for application. In conclusion, it is to be understood that the description above is not to limit the scope of the disclosure.

What is claimed is:

1. A method for accessing to a mobile communication network, the method comprising:
    acquiring, by a user terminal, a session matching level for each of a plurality of cells that are calculated based on a session type of a session initiated by the user terminal as needed, a session data rate available to the user terminal in each cell, and load balance parameters of each cell; and
    accessing, by the user terminal, a cell selected according to the session matching level for each cell, and
    wherein acquiring the session matching level for each of the plurality of cells comprises:
        acquiring the session type of the session initiated by the user terminal as needed, the session data rate available to the user terminal in each cell, and the load balance parameters of each cell, wherein the load balance parameters comprise a switching factor and a frequency migration factor;
        deriving a Radio Access Technology (RAT) session support level of the session type in each cell according to the session type; and
        calculating the session matching level for each cell according to the RAT session support level for each cell, the session data rate available to the user terminal in each cell, the switching factor, and the frequency migration factors in each cell.

2. The method according to claim 1, wherein acquiring the session data rate available to the user terminal in each cell comprises calculating the session data rate available to the user terminal in each cell according to a Signal to Interference plus Noise Ratio of the path from the user terminal to each of a plurality of base stations and a minimum resource unit allocated to the session by each cell.

3. The method according to claim 1, wherein acquiring the session matching level for each cell comprises receiving the session matching level transmitted by each cell, and wherein the session matching level for each cell is calculated based on the session type of the session initiated by the user terminal as needed, the session data rate available to the user terminal in each cell, and the load balance parameters of each cell.

4. The method according to claim 1, wherein accessing the cell selected according to the session matching level for each cell comprises:
    selecting the cell with a highest session matching level to access; and
    selecting to access the cell with a lightest load among the cells.

5. The method according to claim 4, wherein after selecting the cell with the highest session matching level to access, the method further comprises selecting the cell with a next highest session matching level to access if the access is failed, and wherein the cell with the next highest session matching level refers to the cell next to the cell with the highest session matching level when the cells are arranged in a descending order according to the session matching level.

6. The method according to claim 1, wherein accessing the cell selected according to the session matching level for each cell comprises:
selecting the cell with a highest session matching level to access; and
randomly selecting to access any one of the cells with the highest session matching level when there is more than one cell with the highest session matching level.

7. A method for accessing to a mobile communication network, the method comprising:
acquiring, by a network-side device, a session type of a session initiated by a user terminal, a session data rate available to the user terminal in a serving cell, and a plurality of load balance parameters of the serving cell;
calculating, by the network-side device, a session matching level for the serving cell according to the acquired session types, the session data rate available to the user terminal in the serving cell, and the load balance parameters of the serving cell,
wherein calculating the session matching level for each cell comprises:
acquiring the session type of the session initiated by the user terminal as need, the session data rate available to the user terminal in each cell, and the load balance parameters of each cell, wherein the load balance parameters include a switching factor and a frequency migration factor;
deriving a Radio Access Technology (RAT) session support level of the session type in each cell according to the session type; and
calculating the session matching level for each cell, according to the RAT session support level for each cell, the session data rate available to the user terminal in each cell, the switching factor and the frequency migration factors in each cell, and
wherein the method further comprises either:
transmitting the session matching level to the user terminal so that the user terminal accesses to a selected cell among a plurality of cells, wherein the selected cell is selected according to the received session matching level for each cell; or
acquiring session matching levels transmitted by other cells, selecting, according to the session matching levels for the serving cell and other cells, the selected cell for the user terminal, and notifying the user terminal of the selected cell for the user terminal to access.

8. The method according to claim 7, wherein acquiring the session data rate available to the user terminal in the serving cell comprises calculating the session data rate available to the user terminal in the serving cell according to a Signal to Interference plus Noise Ratio of the path from the user terminal to a base station of the serving cell and a minimum resource unit allocated to the session by the serving cell.

9. The method according to claim 7, wherein the load balance parameters include a frequency migration factor and a switching factor, and wherein the method further comprises:

adjusting the frequency migration factor based on a spectrum resource available in the serving cell; and
adjusting the switching factor based on a number of switching times of a session in the serving cell, and
wherein calculating the session matching level for the serving cell based on the acquired session type, the session data rate available to the user terminal, and the load balance parameters comprises calculating the session matching level for the serving cell according to the acquired session type, session data rate available to the user terminal in the serving cell, and adjusted frequency migration factor and/or adjusted switching factor of the serving cell.

10. The method according to claim 9, wherein adjusting the frequency migration factor based on the spectrum resource available in the serving cell comprises:
increasing the frequency migration factor according to a predetermined strategy when the spectrum resource available in the serving cell exceeds a preset first available spectrum resource threshold value; and
decreasing the frequency migration factor according to the predetermined strategy when the spectrum resource available in the serving cell is less than a preset second available spectrum resource threshold value, and
wherein the first available spectrum resource threshold value is larger than the second available spectrum resource threshold value.

11. The method according to claim 10, further comprising:
acquiring load information of the serving cell and adjacent cells; and
calculating the spectrum resource available in the serving cell and the adjacent cells based on the load information of the serving cell and the adjacent cells.

12. The method according to claim 10, further comprising acquiring from an Operation Administration and Maintenance (OAM) module the first available spectrum resource threshold value, the second available spectrum resource threshold value, the first session switching time threshold value, and the second session switching time threshold value of the serving cell.

13. The method according to claim 10, further comprising:
acquiring load information of the serving cell and adjacent cells; and
setting the first available spectrum resource threshold value, the second available spectrum resource threshold value, the first session switching time threshold value, and the second session switching time threshold value of the serving cell according to the load information of the serving cell and adjacent cells.

14. The method according to claim 9, wherein adjusting the switching factor based on the number of switching times of the session in the serving cell comprises:
decreasing the switching factor according to a predetermined strategy when the number of switching times of the session in the serving cell exceeds a preset first session switching time threshold value; and
increasing the switching factor according to the predetermined strategy, when the number of switching times of the session in the serving cell is smaller than a preset second session switching time threshold value, and
wherein the first session switching times threshold value is larger than the second session switching times threshold value.

15. The method according to claim 7, wherein when the terminal selects the serving cell to access, the method further comprises:
acquiring an unused spectrum resource of adjacent cells when there is no spectrum resource available in the serving cell; and
providing the unused spectrum resource to the session when the acquired unused spectrum resource of adjacent cells satisfies preset requirements for the session.

16. The method according to claim 15, further comprising:
acquiring a used spectrum resource in adjacent cells when there is no spectrum resource available in adjacent cells; and
providing the unused spectrum resource to the session when the acquired used spectrum resource satisfies the predetermined strategy.

17. The method according to claim 16, further comprising updating a value of a switching counter after the user terminal accesses to the serving cell, wherein the switching counter is configured to count the number of switching times in the serving cell in order to adjust the load balance parameters.

18. The method according to claim 15, further comprising:
acquiring a used spectrum resource in adjacent cells when the spectrum resource available in adjacent cells does not satisfy the preset requirements of the session; and
providing the unused spectrum resource to the session when the acquired used spectrum resource satisfies the predetermined strategy.

19. A user terminal, comprising:
a memory comprising instructions; and
a processor coupled to the memory, wherein the instructions cause the processor to be configured to:
acquire a session matching level for each of a plurality of cells that are calculated according to a session type of the session initiated by a user terminal as needed, a session data rate available to the user terminal in each cell, and load balance parameters of each cell; and
select a cell to access according to the session matching level for each cell that is acquired by the processor,
wherein the instructions cause the processor to be configured to acquire the session matching level for each cell comprises the instructions causing the processor to be configured to:
acquire the session type of the session initiated by the user terminal as needed, the session data rate available to the user terminal in each cell, and the load balance parameters of each cell, wherein the load balance parameters include a switching factor and a frequency migration factor;
derive a Radio Access Technology (RAT) session support level of the session type in each cell according to the session type; and
calculate the session matching level for each cell, according to the RAT session support level for each cell, the session data rate available to the user terminal in each cell, the switching factor and the frequency migration factors in each cell.

20. The user terminal according to claim 19, wherein the instructions further cause the processor to be configured to receive the session matching level transmitted by each cell that is calculated according to the session type of the session initiated by the user terminal as needed in each cell, the session data rate available to the user terminal in each cell, and the load balance parameters of each cell.

21. The user terminal according to claim 19, wherein the instructions further cause the processor to be configured to select the cell with a highest session matching level to access, and wherein when there is more than one cell with the highest session matching level, the cell with a lightest load among the cells is selected to access.

22. The user terminal according to claim 21, wherein the instructions further cause the processor to be configured to select a cell with a next highest session matching level to access if the access is failed, and wherein the cell with the next highest session matching level refers to the cell next to the cell with the highest session matching level when the cells are arranged in a descending order according to the session matching level.

23. The user terminal according to claim 19, wherein the instructions further cause the processor to be configured to:
acquire the session type of the session initiated by the user terminal as needed, the session data rate available to the user terminal in each cell, and the load balance parameters of each cell; and
calculate the session matching level for each cell according to the session type, the session data rate available to the user terminal in each cell and the load balance parameters of each cell.

24. The user terminal according to claim 19, wherein the instructions further cause the processor to be configured to select the cell with a highest session matching level to access, and wherein when there is more than one cell with the highest session matching level, any one of the cells with the highest session matching level is selected randomly to access.

25. A network-side device, comprising:
a memory comprising instructions; and
a processor coupled to the memory, wherein the instructions cause the processor to be configured to:
acquire a session type of a session initiated by a user terminal as needed, a session data rate available to the user terminal in a serving cell, and load balance parameters of the serving cell; and
calculate a session matching level for the serving cell according to the acquired session type, the session data rate available to the user terminal in the serving cell, and the load balance parameters of the serving cell,
wherein the instructions cause the processor to be configured to calculate the session matching level for each cell comprises the instructions causing the processor to be configured to:
acquire the session type of the session initiated by the user terminal as needed, the session data rate available to the user terminal in each cell, and the load balance parameters of each cell, wherein the load balance parameters include a switching factor and a frequency migration factor;
derive a Radio Access Technology (RAT) session support level of the session type in each cell according to the session type; and
calculate the session matching level for each cell, according to the RAT session support level for each cell, the session data rate available to the user terminal in each cell, the switching factor and the frequency migration factors in each cell, and
wherein the instructions further cause the processor to be configured to either:

transmit the session matching level to the user terminal so that the user terminal accesses to a cell selected according to the received session matching level for each cell; or acquire the session matching levels transmitted by other cells, select a cell for the user terminal based on the session matching levels for the serving cell and other cells, and notify the user terminal of the selected cell for the user terminal to access.

26. The network-side device according to claim 25, wherein the load balance parameters include a frequency migration factor and a switching factor, and wherein the instructions further cause the processor to be configured to:

adjust the frequency migration factor based on a spectrum resource available in the serving cell;

adjust the switching factor based on switching times of a session in the serving cell;

acquire the frequency migration factor and/or the switching factor, and calculate the session matching level for the serving cell according to the acquired session types, the session data rate available to the user terminal in the serving cell, and the adjusted frequency migration factor and/or adjusted switching factor.

27. The network-side device according to claim 26, wherein the instructions further cause the processor to be configured to:

increase the frequency migration factor according to predetermined strategy when the spectrum resource available in the serving cell exceeds a preset first available spectrum resource threshold value; and decrease the frequency migration factor according to the predetermined strategy when the spectrum resource available in the serving cell is less than a preset second available spectrum resource threshold value, and wherein the first available spectrum resource threshold value is larger than the second available spectrum resource threshold value.

28. The network-side device according to claim 27, wherein the instructions further cause the processor to be configured to:

acquire load information of the serving cell and a plurality of adjacent cells; and calculate the spectrum resource available in the serving cell and the adjacent cells based on the load information of the serving cell and the adjacent cells.

29. The network-side device according to claim 27, wherein the instructions further cause the processor to be configured to acquire from an Operation Administration and Maintenance (OAM) node the first available spectrum resource threshold value, the second available spectrum resource threshold value, the first session switching time threshold value, and the second session switching time threshold value of the serving cell.

30. The network-side device according to claim 27, wherein the instructions further cause the processor to be configured to:

acquire load information of the serving cell and a plurality of adjacent cells; and set the first available spectrum resource threshold value, the second available spectrum resource threshold value, the first session switching time threshold value, and the second session switching time threshold value according to the load information of the serving cell and the adjacent cells.

31. The network-side device according to claim 26, wherein the instructions further cause the processor to be configured to:

decrease the switching factor according to the predetermined strategy when the number of switching times of the session in the serving cell exceeds a preset first session switching time threshold value; and increase the switching factor according to the predetermined strategy when the number of the switching times of the session in the serving cell is smaller than a preset second session switching time threshold value, and wherein the first session switching time threshold value is larger than the second session switching time threshold value.

32. The network-side device according to claim 25, wherein the instructions further cause the processor to be configured to:

select the serving cell to access at the user terminal when there is a spectrum resource available in the serving cell and acquire the unused spectrum resource in a plurality of adjacent cells of the serving cell when there is no spectrum resource available in the serving cell; and provide the unused spectrum resource to the session when the acquired unused spectrum resource in the adjacent cells satisfies a predetermined strategy of the session.

33. The network-side device according to claim 32, wherein the instructions further cause the processor to be configured to acquire the used spectrum resource of the adjacent cells of the serving cell when there is no unused spectrum resource available in the adjacent cells or the spectrum resource available in the adjacent cells does not satisfy the requirements of the session, and wherein the processor is further configured to provide the used spectrum resource to the session when the acquired used spectrum resource satisfies the predetermined strategy.

* * * * *

UNITED STATES PATENT AND TRADEMARK OFFICE
CERTIFICATE OF CORRECTION

PATENT NO. : 10,021,633 B2
APPLICATION NO. : 15/069332
DATED : July 10, 2018
INVENTOR(S) : Hongcheng Zhuang, Jietao Zhang and Zezhou Luo It is certified that error appears in the above-identified patent and that said Letters Patent is hereby corrected as shown below:

On the Title Page

Item (30), Line 1: 201110033952" should be "201110033952.X"

In the Claims

Column 27, Line 32 Claim 7: "need" should be "needed"

Signed and Sealed this
Twenty-first Day of August, 2018

Andrei Iancu
*Director of the United States Patent and Trademark Office*